US009483906B2

(12) United States Patent
LeMay et al.

(10) Patent No.: US 9,483,906 B2
(45) Date of Patent: Nov. 1, 2016

(54) ANONYMOUS PLAYER TRACKING WITH MOBILE DEVICES

(71) Applicant: IGT, Las Vegas, NV (US)

(72) Inventors: Steven G. LeMay, Reno, NV (US); Dwayne R. Nelson, Las Vegas, NV (US)

(73) Assignee: IGT, Las Vegas, NV (US)

(*) Notice: Subject to any disclaimer, the term of this patent is extended or adjusted under 35 U.S.C. 154(b) by 112 days.

(21) Appl. No.: 14/095,920

(22) Filed: Dec. 3, 2013

(65) Prior Publication Data

US 2014/0087853 A1 Mar. 27, 2014

Related U.S. Application Data

(63) Continuation of application No. 13/157,166, filed on Jun. 9, 2011, now Pat. No. 8,597,111.

(51) Int. Cl.

| | |
|---|---|
| ***G06F 17/00*** | (2006.01) |
| ***G07F 17/32*** | (2006.01) |
| ***G06Q 30/00*** | (2012.01) |
| ***G06Q 50/34*** | (2012.01) |

(52) U.S. Cl.

CPC ........... *G07F 17/3225* (2013.01); *G06Q 30/00* (2013.01); *G06Q 50/34* (2013.01)

(58) Field of Classification Search

CPC .......... G07F 17/3225; G07F 17/3239; G06Q 30/00; G06Q 50/34

See application file for complete search history.

(56) References Cited

U.S. PATENT DOCUMENTS

| | | | | |
|---|---|---|---|---|
| 6,676,522 | B2 | 1/2004 | Rowe et al. | |
| 7,357,717 | B1 * | 4/2008 | Cumbers | 463/29 |
| 7,611,409 | B2 | 11/2009 | Muir et al. | |
| 7,611,411 | B2 | 11/2009 | Griswold et al. | |

(Continued)

FOREIGN PATENT DOCUMENTS

| | | |
|---|---|---|
| WO | WO-2009/026180 A1 | 2/2009 |
| WO | WO-2009/026295 A2 | 2/2009 |

OTHER PUBLICATIONS

European Search Report for Application No. EP 12171248.3 dated Dec. 4, 2012, 5 pages.

(Continued)

*Primary Examiner* — Pierre Eddy Elisca
*Assistant Examiner* — Carl V Larsen
(74) *Attorney, Agent, or Firm* — Neal, Gerber & Eisenberg LLP

(57) ABSTRACT

A monitoring system for monitoring customer activities within a casino enterprise is described. The monitoring system can be used to determine a current utilization of casino activities so that an optimal mixture of activities can be offered by the casino. Further, the system can be used to identify customers, based on their utilization of the activities, whose loyalty that a casino enterprise may wish to cultivate. In particular embodiments, the monitoring system can be configured to passively track portable wireless devices and associate the portable wireless devices with activities within the casino enterprise that are not attributable to customers registered in a loyalty program. The identity of the person controlling a particular portable device can be unknown. A virtual customer account can be created where the first portable device is used to identify a virtual customer associated with the account. Based upon identification of the first portable device, activities can be associated with the virtual customer and store to the virtual customer account.

27 Claims, 5 Drawing Sheets

(56) References Cited

U.S. PATENT DOCUMENTS

| | | | |
|---|---|---|---|
| 8,469,800 | B2 | 6/2013 | Lemay et al. |
| 8,608,569 | B2 | 12/2013 | Carrico et al. |
| 8,613,659 | B2 | 12/2013 | Nelson et al. |
| 8,613,668 | B2 | 12/2013 | Nelson et al. |
| 8,821,255 | B1 * | 9/2014 | Friedman ............ G07F 17/3255 463/25 |
| 2003/0036425 | A1 * | 2/2003 | Kaminkow et al. ............ 463/25 |
| 2003/0054878 | A1 | 3/2003 | Benoy et al. |
| 2004/0133520 | A1 | 7/2004 | Callas et al. |
| 2005/0124411 | A1 | 6/2005 | Schneider et al. |
| 2006/0154722 | A1 * | 7/2006 | Walker et al. .................. 463/25 |
| 2007/0087834 | A1 * | 4/2007 | Moser et al. ................... 463/42 |
| 2007/0117623 | A1 * | 5/2007 | Nelson et al. .................. 463/29 |
| 2007/0202941 | A1 | 8/2007 | Miltenberger et al. |
| 2007/0249288 | A1 * | 10/2007 | Moallemi et al. .............. 455/68 |
| 2008/0076572 | A1 | 3/2008 | Nguyen et al. |
| 2008/0188308 | A1 * | 8/2008 | Shepherd et al. .............. 463/39 |
| 2008/0224822 | A1 * | 9/2008 | Gelman et al. ................ 340/5.2 |
| 2009/0026180 | A1 | 1/2009 | Yang et al. |
| 2009/0055204 | A1 * | 2/2009 | Pennington et al. ............. 705/1 |
| 2009/0055205 | A1 * | 2/2009 | Nguyen et al. ................... 705/1 |
| 2009/0098943 | A1 | 4/2009 | Weber et al. |
| 2009/0118002 | A1 * | 5/2009 | Lyons et al. .................... 463/29 |
| 2011/0238517 | A1 * | 9/2011 | Ramalingam et al. ...... 705/26.1 |
| 2013/0053136 | A1 | 2/2013 | Lemay et al. |
| 2013/0053148 | A1 | 2/2013 | Nelson et al. |
| 2013/0065668 | A1 | 3/2013 | Lemay et al. |
| 2013/0065678 | A1 | 3/2013 | Nelson et al. |
| 2013/0065686 | A1 | 3/2013 | Lemay et al. |
| 2013/0130777 | A1 | 5/2013 | Lemay et al. |
| 2013/0137509 | A1 | 5/2013 | Weber |
| 2013/0137510 | A1 | 5/2013 | Weber |
| 2013/0137516 | A1 | 5/2013 | Griswold et al. |
| 2013/0165199 | A1 | 6/2013 | Lemay et al. |
| 2013/0165208 | A1 | 6/2013 | Nelson et al. |
| 2013/0165209 | A1 | 6/2013 | Lemay et al. |
| 2013/0165210 | A1 | 6/2013 | Nelson et al. |
| 2013/0165232 | A1 | 6/2013 | Nelson et al. |
| 2013/0196755 | A1 | 8/2013 | Nelson et al. |
| 2013/0252713 | A1 | 9/2013 | Nelson et al. |

OTHER PUBLICATIONS

Foreign Search Report for European Application EP 12171248 dated Nov. 21, 2012, 5 pages.

Office Action in Australian patent application 2012/202828, mailed Apr. 10, 2013, 3 pages.

Notice of Allowance for U.S. Appl. No. 13/157,166 mail date Oct. 24, 2012, 20 pages.

* cited by examiner

ANONYMOUS PLAYER TRACKING WITH MOBILE DEVICES

CROSS-REFERENCE TO RELATED PATENT APPLICATIONS

This application is a continuation of and claims priority to co-pending and commonly assigned U.S. patent application Ser. No. 13/157,166, filed on Jun. 9, 2011 and entitled "ANONYMOUS PLAYER TRACKING WITH MOBILE DEVICES," the entirety of which is hereby incorporated by reference in its entirety and for all purposes.

BACKGROUND

1. Field of the Described Embodiments

The described embodiments relate generally to gaming systems, such as gaming systems deployed in a casino enterprise. More particularly, apparatus and method for developing and maintaining customer loyalty in the casino enterprise are described.

2. Description of the Related Art

Developing and maintaining a loyal customer base is a critical component of operating a successful casino enterprise. In a casino environment, an every changing mix of customers, including identified customers and unidentified customers, are present within the casino enterprise and utilizing casino services at any one time. To encourage customer loyalty, customers whose activities can be tracked and attributed to the customer can be rewarded based upon their utilization of casino services.

Casino enterprises often offer customers the chance to participate in a loyalty program that allows their activities to be tracked. For a customer to participate in a loyal program, the casino enterprise usually requires the customer to provide identifying information. Then, an instrument, such as a magnetic striped card, can be provided to the customer. The instrument can be utilized during various activities within the casino enterprise so that a record of the customer's activities are generated and stored to an account associated with the instrument. As an example, a customer can insert a magnetic-striped player tracking card into a card reader associated with a slot machine to have a record of their gaming activity on the slot machine stored to the account associated with the player tracking card. A disadvantage of this approach is that information stored on the instrument needs to be obtained before it can be attributed to an account associated with the instrument.

At any one time, many unidentified customers of a casino enterprise can be participating in activities that are valuable to a casino enterprise and the casino enterprise may wish to give them awards based upon their activities. However, because the customers have not made their identity known to the casino enterprise, their activities go unrewarded and the casino operator misses out on the opportunity to establish loyalty with potentially valuable customers. The customers may remain unidentified for a number of reasons. For instance, the unidentified customers can be 1) members of the casino enterprise's loyalty program that have forgotten to provide their loyalty program information during an activity, 2) new customers that are willing to have their identity known but have not signed up yet for the casinos loyalty program or 3) customers that are reluctant to give out their personal information and hence, remain anonymous.

Unidentified customers can represent a large fraction of a casino enterprise's revenue. To better tune their operating models and increase profitability, a casino enterprise desires to better know the demographics and behavioral patterns of their customers independent of their identity status within the casino enterprise. Further, casino enterprises wish to distinguish potentially valuable customers and learn their identity so that customer loyalty and hopefully, a pattern of repeat business can be established. In view of the above, methods and apparatus for attributing customer activities within a casino enterprise to particular customers independent of their identity status are desired.

SUMMARY OF THE DESCRIBED EMBODIMENTS

A monitoring system for monitoring customer activities within a casino enterprise is described. The monitoring system can be used to determine a current utilization of casino activities so that an optimal mixture of activities can be offered by the casino. Further, the system can be used to identify customers, based on their utilization of the activities, whose loyalty that a casino enterprise may wish to cultivate that are currently not members of the casino enterprise's loyalty program.

In particular embodiments, the monitoring system can be configured to passively track portable wireless devices and associate the portable wireless devices with activities within the casino enterprise that are not attributable to customers registered in the loyalty program. The identity of the person controlling a particular portable device can be unknown. A virtual customer account can be created where the first portable device is used to identify a virtual customer associated with the account. Based upon identification of the first portable device, activities can be associated with the virtual customer and stored to the virtual customer account.

The monitoring system can include a server. The server can be configured to determine whether a purchase of an activity can be attributed to a customer with a registered customer account, such as a registered customer account in a loyalty program. When the purchase of an activity is not attributable to a registered customer account, the server can be configured to determine whether there is enough of purchase data, biometric data and/or wireless signal data to uniquely identify the transaction related to the purchase of the activity. A criterion for determining whether the transaction is uniquely identifiable can be that there is enough purchase data, biometric data and/or wireless signal data to characterize a particular individual such that future transactions can also be attributed to the individual.

One aspect of the monitoring system relates to a method in a server. The server can include a processor, a memory and a network interface for communicating with remote devices, such as devices configured to control a wager-based game. The method can be generally characterized as including: 1) receiving, via the network interface, transaction information regarding participation in an activity within a casino enterprise; 2) determining, based upon the transaction information, that the activity is not attributable to registered customers with loyalty program accounts in a loyalty program provided by the casino enterprise; 3) determining a location of the purchase of the activity; 4) receiving via the network interlace wireless signal data from a plurality of portable wireless devices deployed within the casino enterprise; 5) determining, based upon the wireless signal data, a location for each of the plurality of portable wireless devices; 6) determining that at least a first portable wireless device is within a threshold distance from the location of the purchase of the activity; 7) generating a virtual customer and a virtual customer account; and 8) storing device identification information that allows the first portable wireless device to be uniquely identified and the transaction information regarding participation in the activity to the virtual customer account where the virtual customer's participation in future activities can be identified based upon at least a detection of the wireless signal data from the first portable wireless device.

BRIEF DESCRIPTION OF THE DRAWINGS

The embodiments will be readily understood by the following detailed description in conjunction with the accompanying drawings, wherein like reference numerals designate like structural elements, and in which.

DESCRIBED EMBODIMENTS

Figure 1:
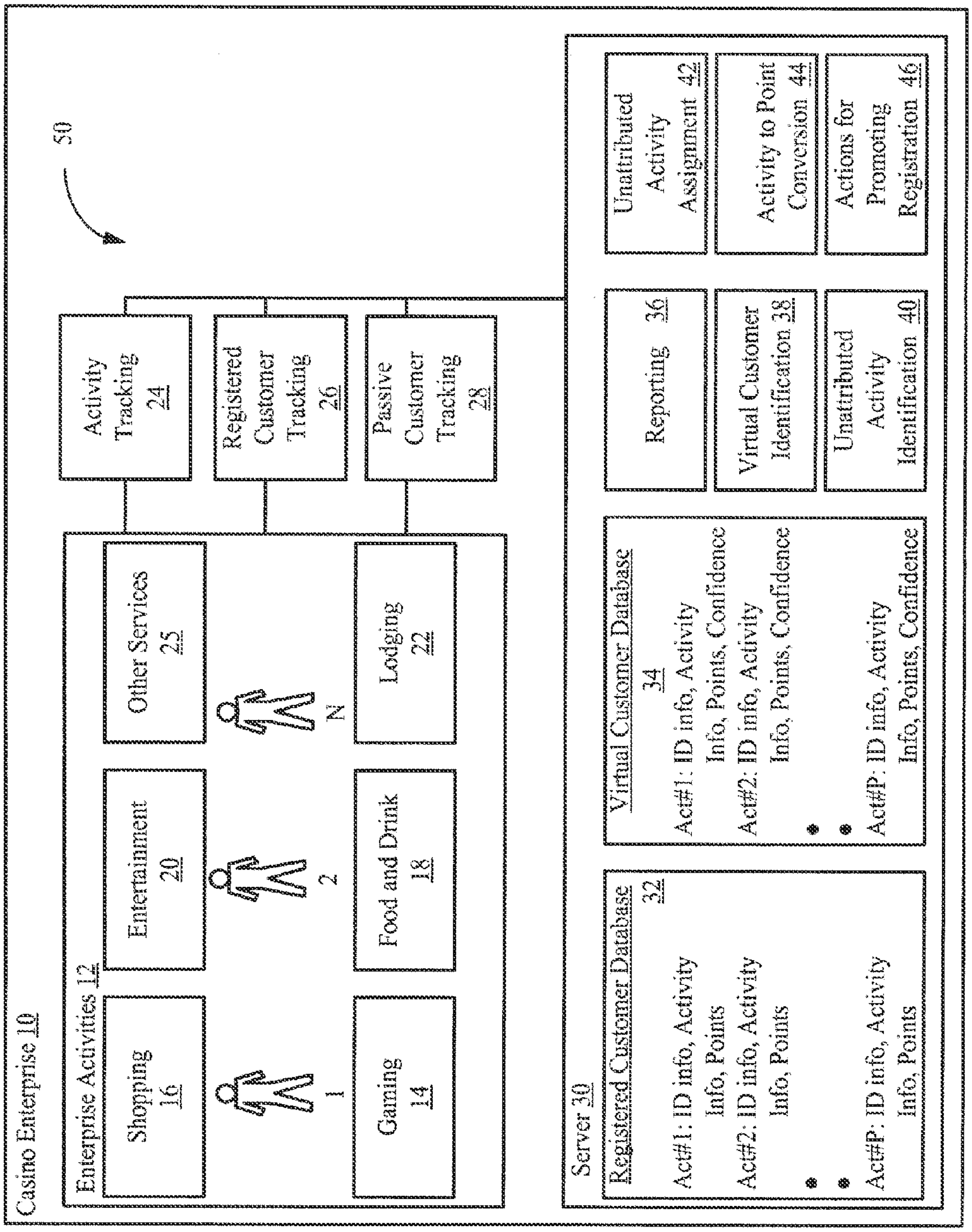
FIG. 1 shows a block diagram of a casino enterprise including a system for monitoring customer activities in accordance with the described embodiments.

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

With respect to the following figures a system for monitoring customer activities within a casino enterprise is described. The monitoring system can be used to determine a current utilization of casino activities so that an optimal mixture of activities can be offered by the casino. Further, the system can be used to identify customers, based on their utilization of the activities, whose loyalty that a casino enterprise may wish to cultivate. In particular embodiments, the monitoring system can include 1) a first set of devices that record purchases of activities within a casino enterprise, 2) a second set of devices that allows customers with a registered account with the casino enterprise, such as in account in a loyalty program, to provide account information so that their purchased activities can be stored to the account and 3) a third set of devices that passively gather information from casino customers, such as biometric information or wireless signal information from wireless devices carried by casino customers. Each of the first, second and third set of devices can be coupled to a remote server.

The remote server can be configured to determine whether a purchase of an activity can be attributed to a customer with a registered customer account, such as a registered customer account in a loyalty program. When the purchase of an activity is not attributable to a registered customer account, the server can be configured to determine whether there is enough of purchase data, biometric data and/or wireless signal data to uniquely identify the transaction related to the purchase of the activity. The wireless signal data may uniquely identify a wireless device that is carried by a customer. If the transaction is uniquely identifiable, such as via wireless signal data that identifies a wireless device carried by a customer, then a virtual customer account can be generated. Transaction data and data that uniquely identify the transaction, such as the biometric and/or wireless data, can be stored to a virtual customer account. Hall or a portion of the pattern of unique identifying information is repeated in future transactions involving purchases of activities and the pattern is recognized by the server, then the future transactions can also be stored to the virtual customer account. The monitoring system including devices and the server and their functions are described in more detail with respect to FIG. 1.

In particular embodiments, the server can be configured to determine locations where an activity that is unattributed to a registered customer is occurring and locations where biometric data and/or wireless signal data have been detected. Based on the relative distance between the location where the activity is occurring and the locations where the biometric data and/or wireless signal data has been detected, the server can be configured to associate the biometric data and/or wireless signal data with the unattributed activity to uniquely identify a transaction associated with the activity. In one embodiment, the server can be configured to determine whether biometric data and/or wireless signal data locations can also be matched to locations where security events have been detected. Further details of mapping activities that are unattributed to registered customers to virtual customers are described with respect to FIG. 2.

Figure 3:
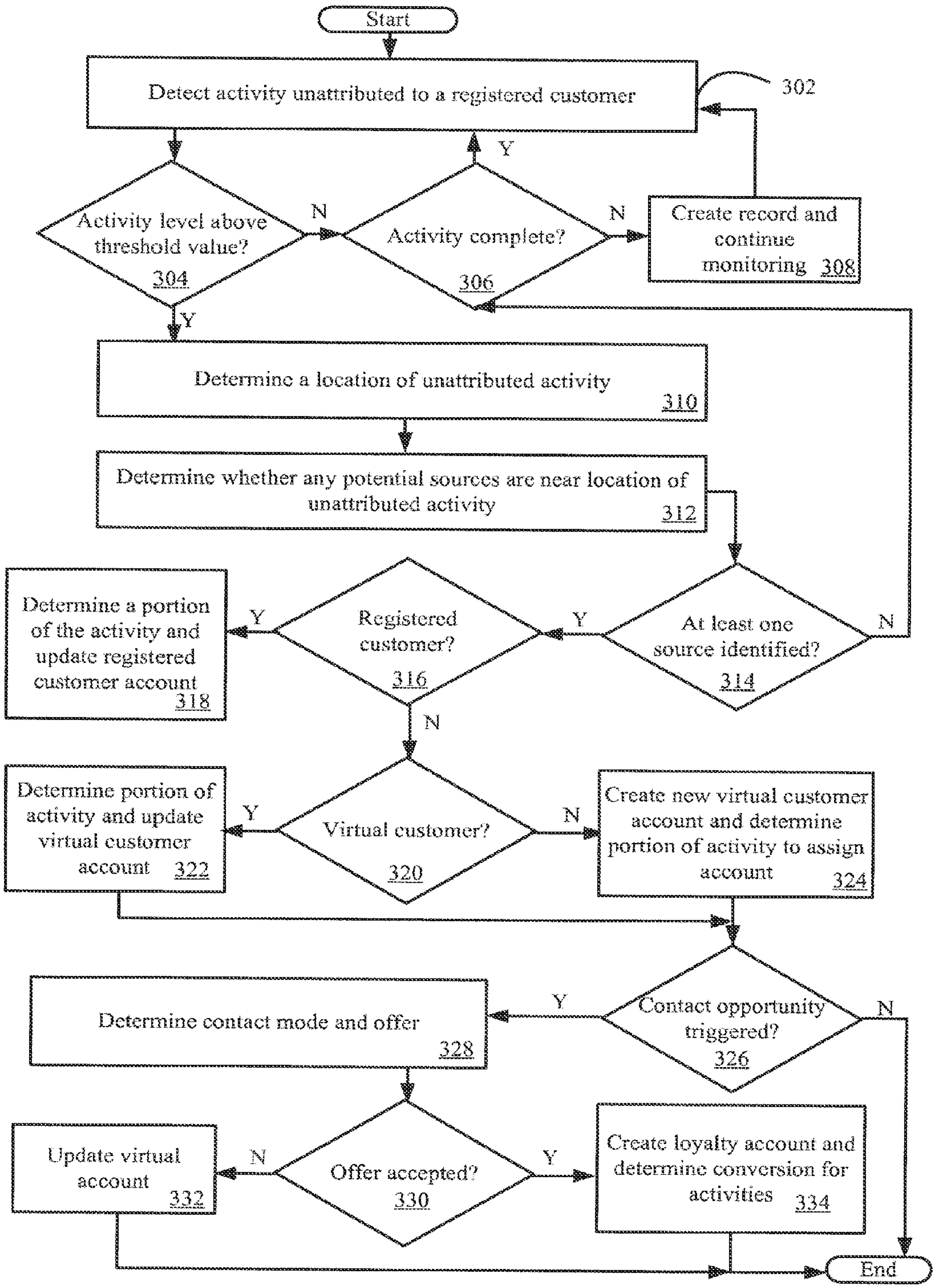
FIG. 3 is a flow chart of a method for determining activities unattributed to known customers and attributing the activities to virtual customers.

Methods applicable to the monitoring system are described with respect to FIG. 3. In particular embodiments, the server can be configured to generate reports detailing the activities of registered customers and/or virtual customers. Further, the server can be configured to trigger actions that encourage virtual customers to become a registered customer, such as a customer registered in a loyalty program. When a registration action is successful, the server can be configured to transfer transactions in the virtual customer account to the registered customer account.

Finally, the monitoring system can include the monitoring of gaming device and gaming activities. In particular, gaming activities that are unattributed to a registered customer can be identified by gathered biometric and/or wireless signal data and associated to a virtual customer. Further, gaming devices can be equipped with apparatus for gathering biometric and/or wireless signal data. Details of gaming activities and gaming devices that can be utilized in the monitoring system are described in more detail with respect to FIGS. 4 and 5. Next, details of the monitoring system and its associated devices are described with respect to FIG. 1.

FIG. 1 shows a block diagram of a casino enterprise 10 including a system 50 for monitoring customer activities in accordance with the described embodiments. The casino enterprise 10 can support a number of activities 12 including but not limited to gaming 14, shopping 16, food and drink services 18 (e.g., restaurants, bars, nightclubs, room service, etc.), entertainment 20 (e.g., shows), lodging 22, and other services 25 (e.g., spa services, pool services, in-room entertainment, meeting rooms, transportation services, etc.). The gaming activities can include providing game play on electro-mechanical devices, such as reel and video slot machines, video card games (e.g., poker and blackjack), lottery games, bingo games, keno games, table games (e.g., craps, roulette, black jack, pai-gow poker, baccarat), card rooms and a sports book. Additional details of wager-based gaming activities are described with respect to FIGS. 4 and 5.

The enterprise activities 12 can be distributed within a building complex. A casino enterprise, such as 10, can include building complexes at multiple locations. The enterprise activities that are provided in a particular building complex can vary from location to location.

At any one time, N customers can be partaking in services associated with the enterprise activities 12. The number of customers and the services in which they are partaking can vary over time. For instance, a customer 1 can register for a room in 22, go shopping 16, participate in gaming activities, such as playing a slot machine, and then retire to their room. As another example, customer 2 might walk into the building complex associated with the enterprise activity, order food and drinks 18 and then depart the building complex. Whereas, customer N may come to the building complex to see a "Broadway" type show, go to the casino, play black jack at a able with a live dealer and then leave the building complex.

Offering a mix of activities that is desirable to their customer base is one factor related to the success and profitability of a casino enterprise 10. Another factor is developing and maintaining a loyal customer base including encouraging repeat business from their most profitable customers. To determine what activities to offer within the casino enterprise 10 and develop a loyal customer base, it is desirable to know what activities that customers are choosing and how much they spending on each activity within the enterprise activities 12. Based on their choices and level of spending, promotions can be selected and offered to particular customers that encourage them to return to the casino enterprise 10. A tracking system 50 that can gather information that can be used to assess activity utilization with the casino enterprise 10 is described as follows.

A tracking system 50 can be implemented within the casino enterprise 10 to determine what activities individual customers are choosing and how much they are spending per activity. In the embodiments described herein, the tracking system 50 can include an activity tracking component 24, a registered customer tracking component 26, a passive customer tracking component 28 and one or more back-end servers, such as 30, that receive data from the components. The activity tracking component 24 can include devices, such as but not limited to 1) point of sale terminals (e.g., cash registers), 2) gaming devices including cash handling capabilities and 3) other devices that include cash handling capabilities.

The devices associated with the activity tracking 24 can be configured to generate information about purchased activities. For instance, a cash register in a restaurant might provide details, such as the items ordered, an amount spent on each item and a total amount spent. As another example, a gaming device, such as a video slot machine might send information indicating an amount of cash deposited into the device, amounts dispensed from the device, an amount of game play time between idle periods, award amounts, etc. In yet another example, a device in a clothing store might send a detailed list of items purchased, an amount spent on each item and a total amount spent. The information generated from each of the activities can be sent to a remote server, such as server 30.

If the activity is purchased with an instrument, such as a credit or debit card, that provides identifying information with the card, then in examples described in the previous paragraph, identification information from the card, might be sent along with the purchase information. In one embodiment, the server 30 can be configured to determine if the identification is associated with a customer that has registered with an account with the casino enterprise 10. For instance, the customer may have a registered account in a loyalty program with the casino enterprise where details about the account are stored in the registered customer database. Thus, the server 30 can be configured to search an account database, such as a registered customer database 32, to deter if the identification information can be matched to a registered customer account.

When a match is determined, details of the activity can be stored to the customer account in the registered customer database 32. For instance, an amount spent on shopping, what was purchased and the shop where it was purchased can be stored to the account. If the account is a loyalty program account, then a point value may be assigned to the purchase where the points accumulated in the account can be used to determine a qualification for comps (complimentary offers) that the casino enterprise might award the customer.

If a match is not determined from the registered customer database 32, then the server 30, as part of the unattributed activity assignment component 42, can be configured to determine if there is enough information to associate the activity with a virtual customer account in the virtual customer database and store the information to the virtual customer account in the database 34. The virtual customer database, such as 34, can include information about transactions made by individuals in the casino enterprise where the transactions are uniquely identified in some way but not yet associated with a customer in the registered customer database 32.

A few criterion for adding a transaction to the virtual customer database 34 under a new virtual customer account can include but are not limited to one or more of A) determining if there is enough unique information about the transaction that it can be eventually assigned to the customer if they choose to register for an account with the casino enterprise 10, B) determining if there is enough unique information about the transaction that future transactions might also be identified using the unique information and associated with the current transaction and C) determining if the transaction is of a sufficient value such that is worth tracking. As an example if the transaction is made with an instrument with identification information, such as a credit card, then at least criteria A) and B) above can be said to have been met.

As another example, if the transaction is made with cash, then some other information may uniquely identify the transaction such that one or more of criteria listed above are met. In particular embodiments, as will be described in more detail in regards to the passive customer tracking component 28, it may be possible to associate passively gathered information, such as information gathered from a biometric data source or information received from a wireless device carried by a customer, to uniquely identify the transaction and meet one or more of the criteria listed above. When one or more of the criteria listed above are met, the transaction can added to a new or an existing virtual customer account in the virtual customer database 34.

Prior to adding the transaction to the virtual customer database 34, the server 30 can be configured to determine whether the transaction can be associated with an existing virtual customer account. For instance, if the transaction is associated with a credit card purchase, a previous virtual customer account may have been opened that includes transactions with the identification information obtained from the credit card. Thus, it may not be necessary to create a new virtual customer account and the transaction can be added to the existing virtual customer account. As another example, if biometric identification data is associated with the transaction, gathered via the passive customer tracking 28, and it can be matched to biometric data associated with an existing virtual customer account, then the transaction can be added to the existing virtual customer account. In yet another example, if wireless device data is associated with the transaction, via data gathered from the passive customer tracking component 28, and it can be matched to wireless device data associated with an existing virtual customer account, then the transaction can be added to the existing virtual customer account.

The registered customer tracking 26 can provide a mechanism that allows a customer registered with an account with the casino enterprise 10 to present the registered account information so that purchases of casino enterprise services can be stored to their account in the registered customer database 32. The tracking in 26 typically requires a customer to provide the registered account information via performance of an action. For instance, the registered customer account information can be stored on a magnetic striped card and the customer can be required to present the card at a gaming device including a card reader, give the card to a pit boss at a table game or slide the card through a card reader at a point of sales terminal to have the purchase of an activity associated with their registered customer account.

With the registered customer tracking 26, if the customer does not provide the registered account information via the performance of the required action, then transactions associated with a particular activity may not be recorded to their account in 32 via this mechanism. For instance, if at a gaming device including a card reader for reading loyalty account information from a loyalty card, the card holder doesn't insert their card, then gaming activity associated with the card may not be recorded to their loyalty account. In particular embodiments, the passive customer tracking 28 might be able to provide enough information to allow the transaction to be associated to an account in the registered customer database even if the customer forgets to perform required action, such as inserting their card into the card reader. For instance, the registered customer may have registered a cell phone with their account. If wireless signal data from the registered cell phone is detected at location that is near the location where an activity not identified by the registered customer tracking 26 is occurring, then the wireless signal data may be matched to a registered customer account and the activity and its value can be added to the registered customer account.

The passive customer tracking 28 can be used to passively gather information associated with a customer. For instance, in one embodiment, if a customer carries a wireless device that emits signals during its operation, then the passive customer tracking 28 can be configured to receive the signals emitted from the wireless device and possibly determine the location from where the signals were emitted. Devices that might emit a wireless signal and can be carried but a customer can include but are not limited cell-phones, tablet computers, laptops, netbook, headsets and the like. The devices can be configured to utilize one or more wireless communication protocols, such as but not limited to 1) a cellular communication protocol (e.g., CDMA or GSM), 2) a LAN communication protocol (e.g., Wi-Fi, 802.11a, 802.11b, 802.11g or 802.1 ln, etc.), 3) a PAN communication protocol (e.g., Bluetooth), 4) a RFID communication protocol, 5) a Near-Field communication protocol or 6) combinations thereof. The casino enterprise 10 can include a plurality of receiver devices for detecting one or more the wireless signals associated with each wireless communication protocol. The receiver devices can be configured to communicate information to the server 30.

The various devices configured with wireless capabilities can be configured to emit wireless signal data that allows them to act as a node in a network. Typically, the wireless signal data emitted from a particular device can include identification information that allows the device to be uniquely identified. The format of the identification information in the wireless signal data emitted by a device can vary depending upon a wireless communication protocol that is being utilized by the device. The receiver devices can be configured intercept wireless signal data emitted from various devices, recognize the communication protocol that is being utilized and then parse wireless signal data to extra unique identifying information about the device, such as a unique identifier that allows it to act as a node on a network, such as a node on a cellular network. In some embodiments, the receiver devices can include multiple antennas for receiving information broadcast in different bands.

In one embodiment, game play where points (e.g., demo play) or money is wagered on a game of chance can be provided via a network, such as the Internet. Users may participate in the games via a device with access to the network, such as a mobile device or a home computer. If a user chooses to participate in one of these activities anonymously, the system can be configured to associate the activity with unique identification information associated with the device that is being used to participate in the activity, such as a MAC address of a mobile device or a home computer. Thus, when a player participates in the activity again or participates in some other activity via the same device and the device is recognized by the system, the activities associated with the device can be grouped together as part of passive customer tracking 28.

In another embodiment, the biometric information associated with a customer can be passively gathered information. For instance, the casino enterprise 10 can include video surveillance devices that can be used to gather biometric information, such as facial images, that can be used to identify particular individuals. Further, the video devices may be used to recognize clothing patterns that might be used to track a customer for a limited time period. In another example, devices that are configured to receive touch inputs can include sensors that allow biometric information, such as finger print information to be gathered. For instance, a touch screen sensor or a mechanical input button on a gaming device or a gaming kiosk can be configured to also detect biometric data. The biometric and wireless signal information can be received by server 30. The server 30 can then be configured to associate the biometric and/or wireless signal information with particular transactions involving purchases of services within the casino.

In other embodiments, the server 30 can be configured to generate reports 36 that detail customers preferences in regards to various activities and amounts spent on each activity by the customers. These reports can include information associated with registered customer database 32 as well as information associated with virtual customers in the virtual customer database 34. The virtual customer identification 38 can involve methods of identifying patterns in the passive customer tracking data and determining whether data pattern is unique enough to be repeatedly tracked. Unique data patterns can be assigned to virtual customers. The unattributed activity identification 40 can be used to identify transactions involving purchases of activities that are not assigned to a customer in the registered customer database. For activities, such as gaming, that can involve a number of transactions, i.e., games played, the unattributed activity identification 40 can involve determining when the activity has begun and when the activity has ended.

In one embodiment, the behavior of registered customers and virtual customers can be compared based upon their tracked activities. For instance, an average frequency of visits by registered customers or virtual customers can be generated and compared. As another example, an average amount wagered by registered and virtual customers can be generated and compared. The comparison of the behaviors of the two groups might be used to assess the effectiveness of a loyalty program. For instance, if the two groups exhibited almost identical behavior, such as an average amount spent or a frequency of visits, then it might be decided that the cost associated with implementing a current configuration of a loyalty program wasn't justified and the program might be modified.

The unattributed activity assignment 42 can involve determining whether an unattributed activity can be associated with a pattern of data from the passive customer tracking 28. As is described in more detail with respect to FIG. 2, in one embodiment, assignments of unattributed activities to passively gathered data patterns can be based on a relative distance between the activity location and the location determined for the passively gathered data. The activity to point conversion 44 can involve determining how many loyalty points to assign to a particular unattributed activity.

The points accrued for an unattributed activity can be different than the points accrued for activities that are processed via the registered customer tracking 26. In one instance, the points accrued may be different because there may be some uncertainty in regards to whether the activity was actually performed by the customer. In another embodiment, the points accrued for a virtual customer may be less than the points accrued for a registered customer to encourage the virtual customer to become a registered customer. If a virtual customer becomes a registered customer, the registered customer can be credited for activities stored in the virtual customer database 34. The server 30 can be configured to determine how many points the newly registered customer is to be rewarded for each activity in virtual database 34.

Finally, in 46, the server 30 can be configured to initiate actions to promote a customer to register with an account at the casino enterprise 30 or at least further identify themselves. For instance, if a purchase amount of an activity or a group of activities within a time period exceeds a threshold value and the location of the customer that has purchased the activities can be determined, the server 30 can be configured to send a message to a casino person that requests the person to one or more of A) observe the individual and possibly make contact with the individual, B) attempt to register them into the loyalty program, C) possibly provide them with a comp, which may encourage them to register, D) gather additional identifying information about the individual or E) combinations thereof. If the customer is playing a game on a gaming device, then the message can be sent to the gaming device and in response the gaming device may interact with the individual to perform one or more of functions A-E. Next, with respect to FIG. 2, aspects of matching passively gathered customer identification information to unattributed activities, which can be part of the unattributed activity assignment 42, are described in more detail.

Figure 2:
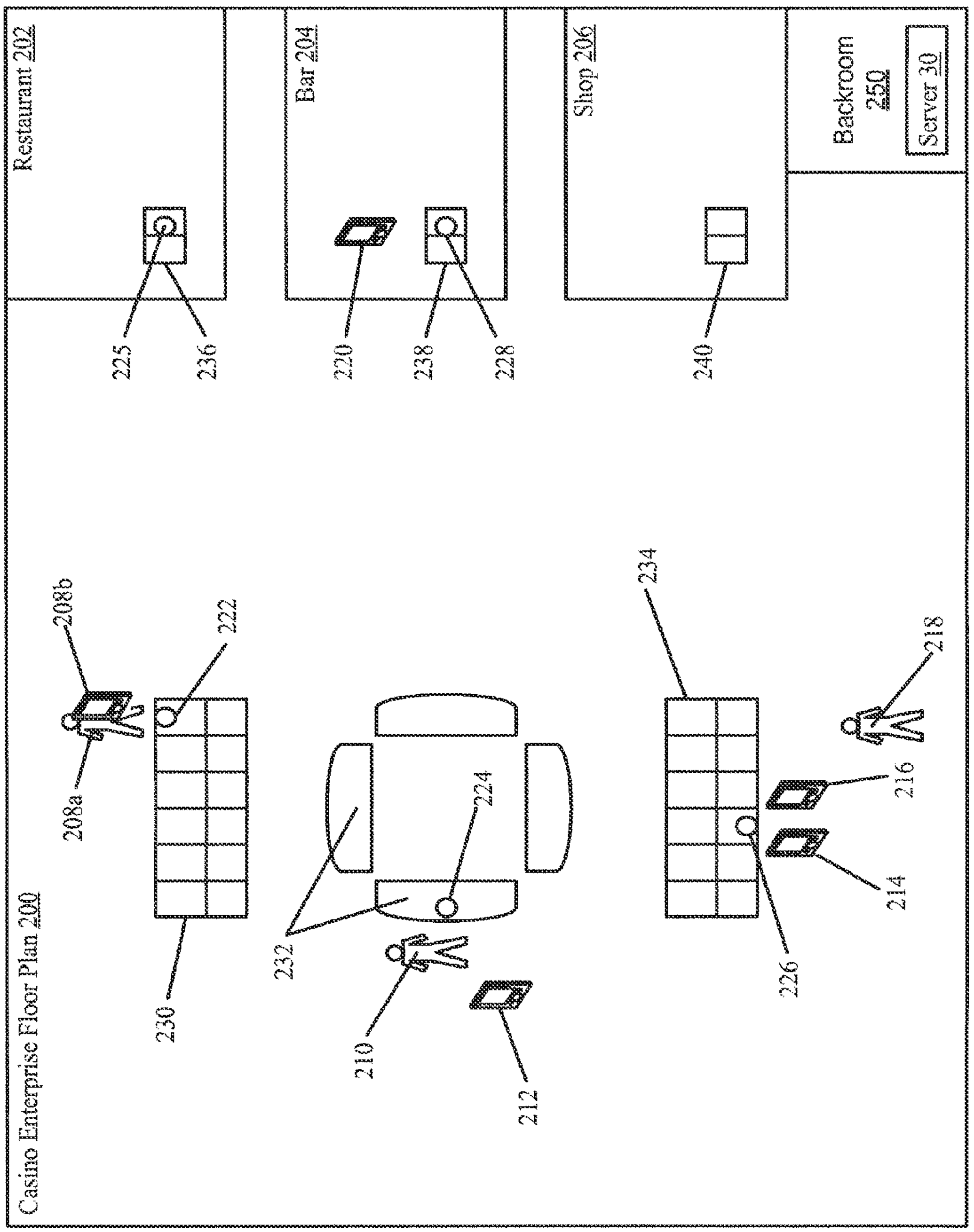
FIG. 2 shows a block diagram of a casino enterprise floor plan where the various activities in a casino enterprise are being purchased and tracked in accordance with the described embodiments.

FIG. 2 shows a block diagram of a casino enterprise floor plan 200 where the various activities in the casino enterprise 10 are being purchased and tracked in accordance with the described embodiments. In particular, the identification of unattributed activities, i.e., the activities not associated with the registered customer tracking 26, and the assignment of the unattributed activities to virtual customers is described. As described with respect to FIG. 1, via passive customer tracking, information can be obtained from at least from biometric sources (e.g., video cameras), or wireless signal sources (e.g., cell phones or headsets). In FIG. 1, the biometric data sources and their estimated location on the casino enterprise floor plan 200 are represented by people, such as 208*a*, 210 and 218. The wireless device sources and their estimated location are represented by the smart phone images, such as 208*b*, 212, 214, 216 and 220.

The casino enterprise floor plan 200 includes a casino with gaming device banks (e.g., slot machine banks), 230, table games, such as 232, and 234, a restaurant 202, a bar, a shop 206. The restaurant 202, the bar 204 and the shop 206, each include point of sale terminals 236, 238 and 240, respectively. A transaction involving a purchase associated with an activity can be performed via the point of sale terminals. A server 30, located in a backroom 250, can receive information from these devices and from sensors used to gather biometric and wireless signal information as part of the monitoring system 50 described with respect to FIG. 1. The server 30 can be connected to the devices via local area network.

A number of locations, 222, 225, 224, 225, 226 and 228 where unattributed activities (i.e., unattributed to a customer with a registered casino account) are determined to be occurring at a particular time are shown. The number and location of unattributed activities can vary from moment to moment as some activities unattributed activities are completed while new ones are initiated. A first unattributed activity, 222, is shown occurring at a gaming device in bank 230. A second unattributed activity 224 is shown occurring at game table 232. A third unattributed activity 226 is shown occurring at a gaming device in bank 234. A fourth unattributed activity 225 is shown occurring at point of sale terminal 236. A fifth unattributed activity 228 is shown at point of sale terminal 238.

The server 30 based upon the data it receives from various devices can be configured to determine that an unattributed activity has been initiated and determine a location of the unattributed activity. In regards to location determination, a device, such as a gaming device or a point of sale terminal, may send out unique device identification information. A remote server, such as 30, that receives the unique device identification information can maintain a database of device locations as function of the device identification information. Based upon, the device identification information the device location can be determined. In other embodiments, the device itself can send location information to the remote server 30. For instance, the device can be configured to determine its location using a mechanism, such as a GPS receiver or radio receivers to determine its location using wireless signal triangulation.

The server 30 can be configured to determine when new unattributed activities have started. For instance, gaming devices, such as ones in bank 230 and 234 can send information to a remote server that credits have been deposited on the gaming device via some mechanism (e.g., cash or a ticket has been inserted in bill and ticket acceptor) and then game play has begun. This information can be sent to a server 30. The server 30 can determine that a new activity has begun because, before the credits were deposited, the gaming device has been idle for a certain period above a threshold amount with no credits remaining. If the credits are deposited in a time period below the idle time threshold amount, then the server 30 may determine that the credits are part of on-going activity on the gaming device. The server 30 may determine that activity is unattributed because the gaming device has not reported receiving any information associated with a registered account at the casino, such as information read from a loyalty card inserted into a card reader at the gaming device.

An electro-mechanical gaming device can send information to a remote server that can be used to determine a gaming activity is ended. The indicators can include but are not limited to 1) information regarding a period of idle time, 2) information from a sensor, such as a camera, that indicates a player is no longer present proximate to the device and 3) an indication that a cash out command has been performed on the gaming device. Further, the electro-mechanical gaming device can send information to a server, such as 30, that can be used to determine whether a gaming activity has begun. For instance, credits can be deposited on the gaming device and a wager-based game can be initiated to indicate a new gaming activity has begun. During the gaming activity, a number of games can be played where different wagers and award amounts are associated with each game. If the gaming activity can be associated with a beginning and an end, then a time period indicating the length of the gaming activity can be determined.

For a live table game, in some embodiments, the location, the beginning of the activity and the end of the activity can be reported by a live person. For instance, person proximate to activity 224 can enter via an interface on a device in communication with server 30 that a person has sat down at a particular seat at a particular table and begun game play. During their game play, the person may indicate wager amounts made and amounts played via the interface. When the person leaves, then this can be indicated by the interface. If any unique information was learned about the player, such as their first name, and any unique identifying features, such as scars, tattoos, or birth marks, unique accessories, such as jewelry or clothing items, this information can be entered via the interface and sent to server 30. A casino server person bringing the person drinks might also have an interface that communicates with the server 30 to report this type of information. For instance, the casino server person might report a drink order that was made as well as unique identifying features to the server 30. The server 30 can use this information to create a virtual customer and a virtual customer account.

In regards to the point of sales terminals, such as 236, 238 and 240, the terminals can send purchase information on a transaction by transaction basis related to the purchase of an activity to the server 30. In some embodiments, it may be possible to associate a length of time with the transaction including when it began and when it ended. For instance, a hostess might enter when a party is seated at a particular table and when the party leaves the table or a server may record when a food order is taken for a particular party. This information can be sent to server 30 and used to determine how long the activity lasted in the restaurant. The point of sales terminals can send device identification information that allows their location to be determined.

After an unattributed activity is identified and its location is determined, the server 30 can be configured to determine whether there is any biometric and/or wireless information located near the location of the unattributed activity. Based on the relative distance between the unattributed activity and the location designated for the wireless signal information and/or biometric information, the server 30, as described to FIG. 1, may determine that the wireless signal information and/or biometric information are close enough to the location of the activity to uniquely identify the activity and associate the activity with a virtual customer. If an existing virtual customer account includes the wireless signal information and/or biometric information associated with the activity, then the activity can be assigned to the existing virtual customer account. If the activity is not associated with an existing virtual customer account and meets the criterion for establishing a new virtual customer and virtual customer account, then the new virtual customer account can be created and the activity can be added to the new virtual customer account.

As examples, the activity 222 can be associated with biometric information **208*a* and wireless signal information 208*b* and assigned to a new or existing virtual customer account. In addition, biometric information 210 can be associated with activity 224 and associated with a new or existing virtual customer account. Further, wireless signal source information 220 can be associated with activity 228** and a new or existing customer account.

When multiple biometric and/or wireless signal sources are located near an activity, then in one embodiment, whether the source is to be associated with an activity can be determined based upon a relative distance of the location of the source to the activity relative to the location of the activity. If the source location is considered too far away, e.g., more than arms length or a few feet from an activity location, then in some embodiments, the source may not be associated with the activity. This distance can be referred to as a threshold distance. For instance, wireless signal source 212 may be determined to beyond a distant threshold from activity location 224 such that it is not considered associated with the activity occurring at activity location 224. In another example, biometric signal source 218 (e.g., an image of person taken from a surveillance camera) may be determined to be too far away from the activity location 226 for it to be associated with the activity.

If a single biometric and/or wireless signal source is determined to be within an acceptable threshold distance from an activity location, then information from the single source can be associated with the activity. For instance, the biometric source 210 location can be determined within the acceptable threshold distance associated from activity location 224 and thus, information from the source can be associated with the activity at location 224 in the virtual customer database. In another example, the wireless device signal source 220 can be within the acceptable threshold distance associated from activity location 228 and thus, information from source 220 can be associated with the activity at location 228 in the virtual customer database.

In some embodiments, an activity can be determined to occur at an activity location where neither biometric or a wireless signal source is detected. For instance, near activity location 225, a wireless signal source within an acceptable threshold distance or a biometric signal source may not be detected within the acceptable threshold distance. In this example, if the transaction at activity location 225 is a cash transaction, the server 30 may not have enough information to uniquely identify the transaction such that the creation of a virtual customer to associate with the transaction is warranted.

Multiple sources of biometric and/or wireless signal data can be located proximate to an activity location. In many instances, when multiple biometric sources and/or wireless signal sources are located proximate to one another and activity location, it may not be clear 1) which source can be associated with the activity and 2) whether each of the sources is associated with a different individual or 3) two or more of the sources is associated with the same individual. For instance, biometric source 208*a* and wireless source 208*b* may be both determined to be associated with the activity at location 222 because they are within a threshold distance from the activity. The biometric source data may have been received via a touch sensor on the gaming device and include image data while the wireless signal source may have been pin-pointed via one or more wireless receivers located nearby.

The biometric data can be received multiple times and thus, the server 30 can determine it is associated with the activity. However, the server 30 may not be able to determine if the wireless device is carried by the person that provided the biometric data or someone else. If a time period can be determined for the activity, one method of making the determination of whether the wireless device is to be associated with the activity can be if the wireless device was in the vicinity of the activity for a similar time period. Another method of making the determination can be to check video surveillance data to see whether a single or multiple people are in the vicinity of the gaming device during the time period of the activity. Yet another method of making the determination can be if the wireless device signal data is repeatedly detected when the biometric data is detected.

An example of using a time period to determine whether the wireless device is to be associated with an unattributed gaming activity is described as follows. An unattributed gaming activity can be determined to last from a first time to a second time. Between the first time and the second time, one or more wireless devices signals can be detected proximate to the gaming activity. The length of time that each of the wireless signals is in the vicinity of the unattributed gaming activity including when the wireless signals were first detected can be determined and compared to the first time and the second time. If wireless signal data from a first device is detected at about the same time as the first time and then its presence is detected continuously or at least multiple time from the first time to the second time, then the server 30 can be configured to associate the first device with the unattributed gaming activity.

If wireless signal data from a second device is first detected prior to the start of the gaming activity and ends prior to the end of the gaming activity or after the gaming activity. It might be assumed that the second device is associated with someone placed nearby (e.g., standing or sitting) that is not participating in the activity and the second wireless device may not be associated with the gaming activity. If wireless signal data from the second wireless device is first detected after the first time and then only detected for a brief time. It might be assumed the second wireless device data carried by a person walking by the unattributed gaming activity. Thus, the second wireless device data may not be associated with the unattributed gaming activity by the server 30.

In general, the server 30 can be configured to determine whether position of the wireless devices over time and compare that to the time period of an unattributed activity (if it is available). The comparison may be used to filter out wireless devices carried by individuals that are not participating in the activity. For instance, wireless devices of individuals that happen to be standing nearby or walk past during the activity.

If biometric data is available, such as image data obtained from video surveillance cameras, the image data might be used to confirm a determination that a wireless device is or is not associated with an unattributed activity. For instance, a change in position determined for a less device over time might match image data showing a person walking past. As another example, a wireless device might be stationary for a time period and image data may be used to confirm that a nearby person was also stationary for a similar time period. Matching movements detected for wireless devices in a particular area to movements detected for individuals in the particular area might provide a method to link biometric image data to less devices. For instance, if the movement of an individual in the image data approximately matches the movement of a wireless device detected in the area and facial image data is obtainable, then the facial image data might be added to a virtual customer account or a registered customer account that includes information about the wireless device matched to the image data.

The match may only be approximate because the positional data determined fir the wireless data may not exactly match the positional data determined from the image data. The wireless data may be different than the image data because of where the wireless device is being carried as well as the fidelity of the method used to determine the position of the wireless device, which may not be as accurate as the position determined from the image data. Thus, the server 30 can be configured to compare paths generated from each of the wireless device data and image data and determine whether the paths match well enough that the wireless device can be said to be carried by a person detected in the image data.

When the biometric data and the wireless signal data are both determined to be associated with the same individual then both can be stored to a virtual customer account. If the biometric data or the wireless signal, each alone or in combination with one another is later detected and associated with an activity, then the activity can be stored to a virtual customer account associated with the biometric data and the wireless signal data. The account data may indicate how the activity was associated to the virtual account, such as via wireless data alone, biometric data alone or wireless data in combination with biometric data.

In this example, if the wireless signal data is not confirmed initially to be associated with the activity, the wireless signal data can be stored in a provisional manner to the virtual account for some time period to determine whether the wireless signal data is associated with the individual, such as if it can be confirmed via video surveillance data or via the fact that the biometric data and wireless signal data have been detected together multiple times. If an activity is associated to a virtual customer account via only the wireless signal data that has not been yet confirmed as being associated with the account, the activity can be stored to the account. However, if the wireless signal data is not confirmed to be associated with the virtual customer account within a time period, the wireless data and the activities associated via using only the wireless data can be deleted from the virtual account. In embodiment, a new virtual customer account might be created that includes the wireless data information and the activities associated with the wireless data that were deleted from the other virtual customer account.

It may not be possible to determine which of two different data sources, such as two different wireless signal sources are to be associated with an activity. As an example, the two wireless signal sources 214 and 216 may be each located close enough to activity 226 that it may not be possible to determine which wireless signal source is associated with the individual performing the activity. In one embodiment, two virtual customers can be created where first wireless signal data is associated with a first customer and the second wireless signal data is associated with a second customer. If the wireless signal data is later determined to regularly appear together, it might be decided that the wireless device data is carried by the same individual and the two virtual accounts can be later combined.

in one embodiment, the activity credit can be split among the virtual accounts. For instance, ½ credit might be given to one account and ½ the credit might be given to the other account. If there is some indication that one wireless device is more likely to be associated with the activity and then another wireless device, such as if one is one device is determined to be closer to the activity location then the other wireless device, then the split can be made unevenly. For instance, based on distance, one account might be given 70% credit for the activity while another device might be given 30% credit. The distance may not be used to eliminate one device or the other because there may be some uncertainty in the calculation. For instance, the location might be determined with an error bar of plus or minus one foot.

If a virtual account is later converted to a regular account, then the fact that an activity is split between two or more accounts might lessen the amount of points that an individual is credited for the activity. In one embodiment, during registration for an account, an individual might reveal information regarding wireless devices they carry or reveal biometric information. When the server 30 receives this information, it can be configured to search the virtual customer database to determine whether any activities have been associated with this information. Then, the activities in the virtual customer database may be credited to the customer's account in the registered account database.

In FIG. 2, activities related to purchases of services and their locations relative to the detection location of biometric data source and/or wireless data sources were described to determine if a biometric data source and/or a wireless data source can be associated with the activity. In alternate embodiments, biometric data sources and/or wireless data sources can be associated with other types of activities. For instance, if a security event is detected in a particular area, then the system can be configured to determine if any biometric data and/or wireless data can be associated with the security event. The system can be configured to store a record of the security event and any associated biometric and/or wireless data. In future events, the system can be configured to determine whether there is a pattern of certain biometric and/or wireless signal data being detected when security events are detected. If a pattern is detected, this biometric and/or wireless data may be used to determine possible suspects associated with the security event.

FIG. 3 is a flow chart of a method for determining activities unattributed to registered customers and attributing the activities to virtual customers. The method can be implemented in the monitoring system described above with respect to FIG. 1. In one embodiment, it can be implemented on the server 30 described above with respect to FIGS. 1 and 2. However, in alternate embodiments, portions of the method can be performed on other devices in the monitoring system 50 in combination with a portion of the method performed on the server 30. For instance, in one embodiment, based upon data received from a gaming device, the server 30 can be configured to determine that an unattributed gaming activity has started. In another embodiment, the gaming device can be configured to make this determination and then notify the server 30 that an unattributed gaming activity has started.

In 302, an activity unattributed to a registered customer, such as a customer registered in a casino enterprises loyalty program, can be detected in the system. In one embodiment, the activity can be game play at a gaming device, such as a video slot machine. In 304, the system can determine whether the activity is above a threshold value. For a gaming activity, the threshold value can relate to amount of chips bought at a gaming table or an amount of credits purchased on a gaming device followed by an amount wagered on a game play. For instance, a $5 wager on a $5 denomination slot device may be more likely to exceed the threshold value than a $0.05 wager on a 1 cent denomination slot device.

In 306, the system can determine whether the activity is complete. If the activity is complete and it doesn't exceed the threshold value, then it may not be saved to a virtual customer account. Then, in 302, the system can continue to determine if any activity unattributed to a registered customer has occurred. If the activity is not complete, the system can create a record and continue monitoring the activity and periodically check in 304 to determine if the activity level is above a threshold value. For instance, initially a player's gaming activity on a gaming device may not exceed the threshold value in 304 but after an extended period of gaming activity, the threshold activity can be exceeded.

In 310, if the activity level is above the threshold value, the system can determine a location of the unattributed activity. For instance, if the activity has occurred on a gaming device, then the gaming device can send unique device identification information. The system can store a table listing a location for each device according to the unique device information and a table look-up can be performed to determine a location of the unattributed activity.

The system can include a sensor network that allows biometric and/or wireless signal data to be passively gathered. The system can be configured to determine a location of the source of the biometric data or a location of the source of the wireless signal data. For instance, a location of the wireless signal data can be determined based on triangulation of signals received from a wireless device and/or determination of signal strength from a wireless device. An error bar can be approximated for the location determined from the biometric and/or wireless data, such as the device or a person, is centered at a location with some specified error radius.

In 312, the system can determine whether there are any potential biometric and/or wireless data sources near the location of an unattributed activity. In 314, the system can check to determine if there is at least one biometric and/or wireless signal source identified within a specified threshold distance of the unattributed activity. If there is not a biometric and/or wireless source detected nearby, then if the activity is not complete the system can create a record and continue to monitor the activity in 308. If the activity is complete, then the activity may not be associated with a virtual customer.

If at least one biometric and/or wireless signal source is identified, in 316, the system can check to see if the source is associated with a registered customer. If the multiple sources are identified, this step can be repeated for each identified source. In 316, if the source is determined to be associated with a registered customer, then in 318, the system can be configured to determine a portion of the activity to be assigned to the registered customer and update the registered customer account.

In one embodiment, in 318, all of the activity can be credited as points in the same manner as if the activity were learned about via registered customer mechanism (e.g., the customer placing a card with account information in a card reader). In another embodiment, the registered customer may earn lesser amount of points for an activity identified in this way. In yet another embodiment, multiple biometric and/or wireless sources may have been detected and thus, the system can be configured to award less than a full portion of the activity to the registered customer because the points are split among other registered and/or virtual customers associated with the multiple biometric and/or wireless sources.

In 320, it can be determined whether the biometric and/or wireless source is associated with an existing virtual customer. In 322, if the biometric and/or wireless source is determined to be associated with an existing virtual customer, then all or portion of the activity can be attributed to the virtual customer's account. In 324, if the biometric and/or wireless source is not associated with an existing virtual customer's account, then a new virtual customer account can be created. Then, the system can be configured to assign all or a portion of the activity to the new virtual customer account. Further, information associated with the biometric and/or wireless data that can be used to identify future transactions involving the purchases of activities by the virtual customer can be added to the account.

In 326, based on the one or more transactions in the virtual customer account, the system can be configured to determine whether a contact opportunity has been triggered. In one embodiment, the determination of whether the contact opportunity has been triggered can be based on the value of the one or more transactions in the virtual customer account or only the most recent transaction. In 328, when a contact opportunity has been triggered, the system can be configured to determine a contact mode and/or or offer.

The contact mode can depend on the current location and the nature of the current activity that lead to the triggering of the contact opportunity. For instance, if the biometric and/or wireless signal data indicates the player is at a gaming device, and then commands can be generated that allows a message to be displayed on the gaming device. For instance, commands can be generated at a server and sent to a remote gaming device that instruct the gaming device to display a message indicating the player can earn an award by registering for a loyalty program. In some embodiments, the award can be given to the player independently of whether they decide to enroll in the loyalty program or not. In one embodiment, the gaming device can be configured to generate an interface that allows the person to register for the loyalty program via the gaming device.

In other embodiments, the contact mode can involve sending a person to attempt to contact the virtual customer. The person may be authorized to provide the virtual customer an offer of some type, such as free game play, free meal, free lodging, to the virtual customer. The offer can be in exchange for or independent of whether the person signs up for a registered account or not. The value of the offer may depend on the value of activities stored in the virtual customer's account. In 322, the system can receive information whether the offer accepted and/or whether the virtual customer wishes to register for a loyalty program account. Whether the offer is accepted or not can be added to the virtual customer account if the virtual customer decides not to register in 332. For instance, information regarding the offer and whether the virtual customer accepted the offer or not can be added to the virtual customer account. If the offer is accepted, then points may be deducted from the virtual customer's account.

In 334, if the offer to register is accepted, the system can create a new loyalty account. The activities in the virtual customer account can be transferred to the new loyalty point account. Further, the system can credit the loyalty points to the account based upon the activities and/or points stored in the virtual customer account. Factors that can be considered in the conversion include whether comps have been previously awarded to the virtual player based on the activities in the virtual customer account and a confidence level that the system has that the activity was actually performed by the virtual customer. As noted above, in some instances, activities can be split among virtual customers and/or virtual customers and registered customers. For split activities, the system may credit the new loyalty account with all or a portion of the value amount associated with the activity.

Finally, in particular embodiments, the system may be configured to check the virtual customer accounts for activity. If new activity has not been added to the virtual customer account within a particular time period, then the system can be configured to delete the virtual customer account. When a new virtual customer account is created, a time period may be selected for the virtual customer account where a period of inactivity longer than the time period may result in the virtual customer and their account being deleted. In some embodiments, the time period may depend on the value of the transaction that led to the creation of the new virtual customer. For instance, virtual customer accounts created as the result of more a valuable transaction may be kept a longer amount of time then a virtual customer account created as the result of a less valuable transaction.

Figure 4:
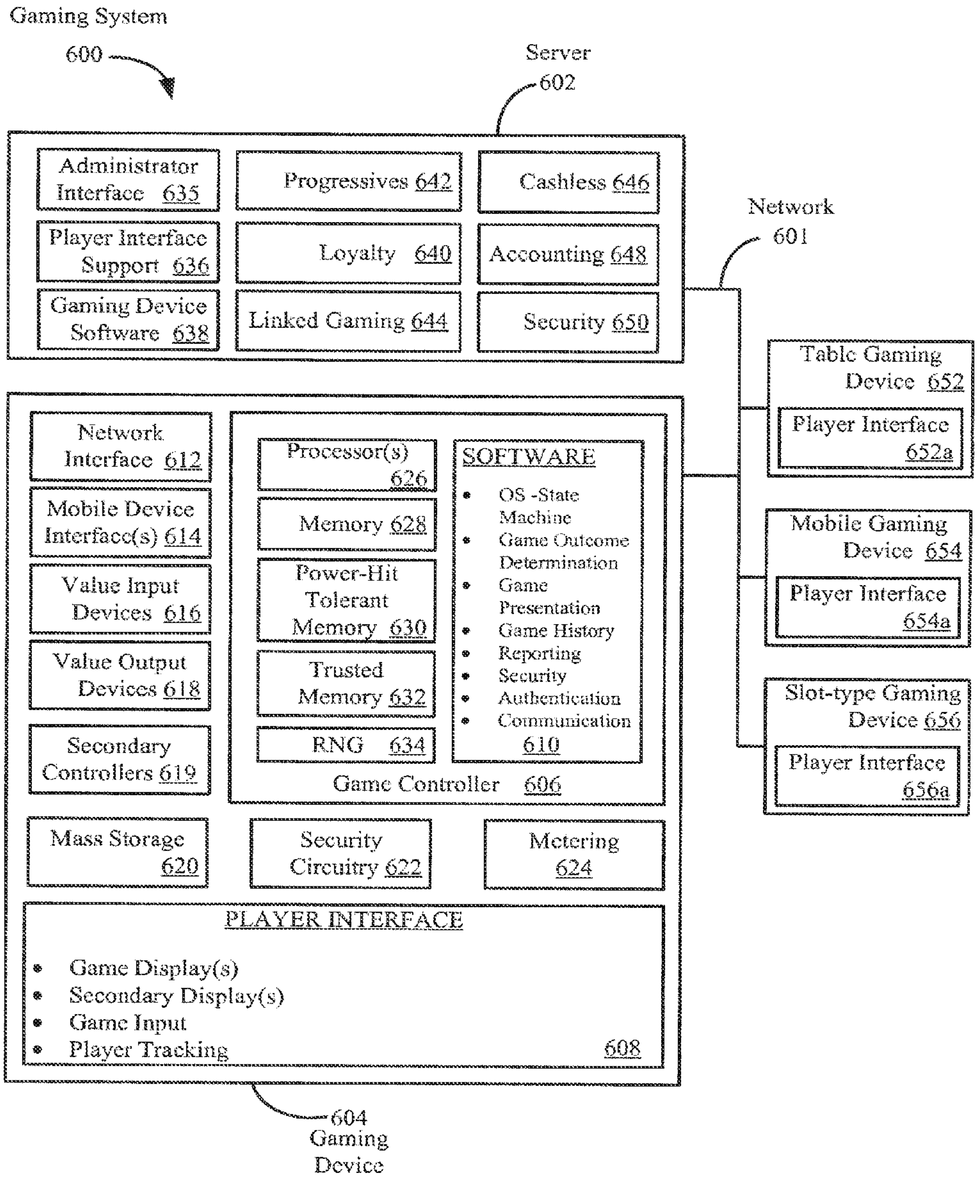
FIG. 4 shows a block diagram of a gaming system including a server and gaming devices in accordance with the described embodiments.

Next, details of gaming systems and gaming devices that are compatible with the monitoring system and the methods described above is discussed with respect to FIGS. 4 and 5. FIG. 4 shows a block diagram of a gaming system 600 in accordance with the described embodiments. The gaming system 600 can include one or more servers, such as server 602, and a variety of gaming devices including but not limited to table gaming devices, such as 652, mobile gaming devices, such as 654, and slot-type gaming devices, such as 656. The table gaming devices, such as 652, can include apparatus associated with table games where a live operator or a virtual operator is employed. The gaming devices and one or more servers can communicate with one another via a network 601. The network can include wired, wireless or a combination of wired and wireless communication connections and associated communication routers.

Some, gaming devices, such as 652, 654 and 656, can be configured with a player interface that allows at least 1) selections, such as a wager amount, associated with a wager-based game to be made and 2) an outcome of the wager-based game to be displayed. As an example, gaming devices, 652, 654 and 656, include player interfaces, 652*a*, 654*a* and 656*a*, respectively. Typically, gaming devices with a player interface are located in publically accessible areas, such as a casino floor. On the other hand, some gaming devices, such as server 602, can be located in publically inaccessible areas, such is in a back-room of a casino or even off-site from the casino. Gaming devices located in publically inaccessible areas may not include a player interface. For instance, server 602 does not include a player interface. However, server 602 includes an administer interface 635 that allows functions associated with the server 602 to be adjusted.

An example configuration of a gaming device is described with respect to gaming device 604. The gaming device 604 can include 1) a game controller 606 for controlling wager-based game played on the gaming device and 2) a player interface 608 for receiving inputs associated with the wager-based game and for displaying an outcome to the wager-based game. In more detail, the game controller 606 can include a) one or more processors, such as 626, b) memory for holding software executed by the one or more processors, such as 628, c) a power-hit tolerant memory, such as 630, d) one or more trusted memories, such as 632, e) a random number generator and f) a plurality of software applications, 610. The other gaming devices, including table gaming device 652, mobile gaming device 654, slot-type gaming device 656 and server 602, can each include a game controller with all or a portion of the components described with respect to game controller 606.

In particular embodiments, the gaming device can utilize a "state" machine architecture. In a "state" machine architecture critical information in each state is identified and queued for storage to a persistent memory. The architecture doesn't advance to the next state from a current state until all the critical information that is queued for storage for the current state is stored to the persistent memory. Thus, if an error condition occurs between two states, such as a power failure, the gaming device implementing the state machine can likely be restored to its last state prior to the occurrence of the error condition using the critical information associated with its last state stored in the persistent memory. This feature is often called a "roll back" of the gaming device. Examples of critical information can include but are not limited to an outcome determined for a wager-based game, a wager amount made on the wager-based game, an award amount associated with the outcome, credits available on the gaming device and a deposit of credits to the gaming device.

The power-hit tolerant memory 630 can be used as a persistent memory for critical data, such as critical data associated with maintaining a "state" machine on the gaming device. One characteristic of a power-hit tolerant memory 630 is a fast data transfer time. Thus, in the event of a power-failure, which might be indicated by a sudden power fluctuation, the critical data can be quickly loaded from volatile memory, such as RAM associated with the processor 626, into the power-hit tolerant memory 630 and saved.

In one embodiment, the gaming device 605 can be configured to detect power fluctuations and in response, trigger a transfer of critical data from RAM to the power-hit tolerant memory 630. One example of a power-hit tolerant memory 630 is a battery-backed RAM. The battery supplies power to the normally volatile RAM so that in the event of a power failure data is not lost. Thus, a battery-backed RAM is also often referred to as a non-volatile RAM or NV-RAM. An advantage of a battery-backed RAM is that the fast data transfer times associated with a volatile RAM can be obtained.

The trusted memory 632 is typically a read-only memory of some type that may be designed to be unalterable. An EPROM or EEPROM are two types of memory that can be used as a trusted memory 632. The gaming device 604 can include one or more trusted memories.

Prior to installation the contents of a trusted memory, such as 632, can be verified. For instance, a unique identifier, such as a hash value, can be generated on the contents of the memory and then compared to an accepted hash value for the contents of the memory. The memory may not be installed if the generated and accepted hash values do not match. After installation, the gaming device can be configured to check the contents of the trusted memory. For instance, a unique identifier, such as a hash value, can be generated on contents of the trusted memory and compared to an expected value for the unique identifier. If the generated value of the unique identifier and the expected value of the unique identifier don't match, then an error condition can be generated on the gaming device 604. In one embodiment, the error condition can result in the gaming device entering a tilt state where game play is temporarily disabled on the gaming device.

Sometimes verification of software executed on the gaming device 604 can be performed by a regulatory body, such as a government agency. Often software used by a game controller, such as 606, can be highly regulated, where only software approved by a regulatory body is allowed to be executed by the game controller 606. In one embodiment, the trusted memory 632 can store authentication programs and/or authentication data for authenticating the contents of various memories on the gaming device 604. For instance, the trusted memory 632 can store an authentication program that can be used to verify the contents of a mass storage device, such as 620, which can include software executed by the game controller 606.

The random number generator (RNG) 634 can be used to generate random numbers that can be used to determine outcomes for a game of chance played on the gaming device. For instance, for a mechanical or video slot reel type of game, the RNG, in conjunction with a paytable that lists the possible outcomes for a game of chance and the associated awards for each outcome, can be used to generate random numbers for determining reel positions that display the randomly determined outcomes to the wager-based game. In other example, the RNG might be used to randomly select cards for a card game. Typically, as described above, the outcomes generated on a gaming device, such as 604, are considered critical data. Thus, generated outcomes can be stored to the power-hit tolerant memory 630.

Not all gaming devices may be configured to generate their own game outcomes and thus, may not use an RNG for this purpose. In some embodiments, game outcomes can be generated on a remote device, such as server 602, and then transmitted to the gaming device 604 where the outcome and an associated award can be displayed to the player via the player interface 608. For instance, outcomes to a slot-type game or a card game can be generated on server 602 and transmitted to the gaming device 604.

In other embodiments, the gaming device 604 can be used to play central determination games, such as bingo and lottery games. In a central determination game, a pool of game outcomes can be generated and then, particular game outcomes can be selected as needed (e.g., in response to a player requesting to play the central determination game) from the pool of previously generated outcomes. For instance, a pool of game outcomes fir a central determination game can be generated and stored on server 602. Next, in response to a request to play the central determination game on gaming device 604, one of the outcomes from the pool can be downloaded to the gaming device 604. A game presentation including the downloaded outcome can be displayed on the gaming device 604.

In other embodiments, thin client type gaming devices, such as mobile gaming devices used to play wager-based video card or video slot games, may be configured to receive at least game outcomes from a remote device and not use an RNG to generate game outcomes locally. The game outcomes can be generated remotely in response to inputs made on the mobile device, such as an input indicating a wager amount and/or an input to initiate the game. This information can be sent from the mobile device to a remote device, such as from mobile gaming device 654 to server 602. After receiving the game outcome from the remote device, a game presentation for the game outcomes generated remotely can be generated and displayed on the mobile device. In some instances, the game presentation can also be generated remotely and then streamed for display to the mobile device.

The game controller 606 can be configured to utilize and execute many different types of software applications 610. Typically, the software applications utilized by the game controller 606 can be highly regulated and may undergo a lengthy approval process before a regulatory body allows the software applications to be utilized on a gaming device deployed in the field, such as in a casino. One type of software application the game controller can utilize is an Operating System (OS). The OS can allow various programs to be loaded for execution by the processor 626, such as programs for implementing a state machine on the gaming device 606. Further, the OS can be used to monitor resource utilization on the gaming device 606. For instance, certain applications, such as applications associated with game outcome generation and game presentation that are executed by the OS can be given higher priority to resources, such as the processor 626 and memory 628, than other applications that can be executing simultaneously on the gaming device.

As previously described, the gaming device 604 can execute software for determining the outcome of a wager-based game and generating a presentation of the determined game outcome including displaying an award for the game. As part of the game outcome presentation one or more of 1) electro-mechanical devices, such as reels or wheels, can be actuated, 2) video content can be output to video displays, 3) sounds can be output to audio devices, 4) haptic responses can be actuated on haptic devices or 5) combinations thereof, can be generated under control of the game controller 606. The peripheral devices used to generate components of the game outcome presentation can be associated with the player interface 608 where the types of devices that are utilized for the player interface 608 can vary from device to device.

To play a game, various inputs can be required. For instance, via input devices coupled to the gaming device 604, a wager amount can be specified, a game can be initiated or a selection of a game choice associated with the play of the game can be made. The software 610 executed by the game controller 606 can be configured to interpret various signals from the input devices, such as signals received from a touch screen controller or input buttons, and affect the game played on the gaming device in accordance with the received input signals. The input devices can also be part of the player interface 608 provided with the gaming device, such as 604.

In other embodiments, the gaming software 610 executed by the game controller 606 can include applications that allow a game history including the results of a number of past games to be stored, such as the previous 10 or 100 games played on the gaming device 604. The game history can be stored to a persistent memory including but not limited to the power-hit tolerant memory 630. The gaming controller 606 can configured to provide a menu (typically, only operator accessible), that allows the results of a past game to be displayed via the player interface 608. The output from the history menu can include a re-creation of the game presentation associated with a past game outcome, such as a video representation of card hand associated with a video poker game, a video representation of a reel configuration associated with a video slot game, and/or raw data associated with the past game result, such as an award amount, an amount wagered, etc. The history menu can be used for dispute resolution purposes, such as if a player complains that they have not been properly awarded for a game previously played on the gaming device 604.

The reporting software can be used by the game controller 606 to report events that have occurred on the gaming device 604 to remote device, such as server 602. For instance, in one embodiment, the game controller 606 can be configured to report error conditions that have been detected on the gaming device 604, such as if a device has malfunctioned or needs attention. For instance, the reporting software can be used to send a message from the gaining device 604 to the server 602 indicating that a printer on the gaming device needs a refill of tickets. In another embodiment, the gaming controller 606 can be configured to report security events that may have occurred on the gaming device 604, such as but not limited to if a door is opened, a latch is activated or an interior portion of the gaming device 604 has been accessed.

In yet other embodiments, the game controller 606 can be configured to report gaming activity and associated events that has been generated on the gaming device, such as a deposit of cash or an indicia of credit, at the gaming device, a generation of game outcome including an associated award amount and a dispensation of cash or an indicia of credit from the gaming device 604. As part of a loyalty program, the gaming activity can be associated with a particular player. The reporting software can include player tracking elements that allow the gaming activity of a particular player to be reported to a remote device, such as server 602.

The game controller 606 can execute the authentication software to verify the authenticity of data and/or software programs executed on the gaming device 604. For instance, the authentication software can be used to verify the authenticity of data and/or software applications when they are first downloaded to the gaming device 604. Further, the authentication software can be used to periodically verify the authenticity of data and/or software applications currently residing on the gaming device, such as software applications stored on one of the memories coupled to the gaming device 604 including applications loaded into the memory 628 for execution by the processor 626.

The communication software executed by the game controller 606 can be used to communicate with a variety of devices remote to the gaming device 604. For instance, the communication software can be used to communicate with one or more of a) servers remote to the device, such as 602, b) other gaming devices, such as table gaming device 652, mobile gaming device 654 and slot-type gaming device 656 and c) mobile devices carried by casino personnel or players in the vicinity of the gaming device 604. Via the communication software, the game controller can be configured to communicate via many different communication protocols. For instance, different wireless and/or wired communication protocols can be implemented. Further, proprietary or non-proprietary gaming specific protocols can be implemented. For instance, gaming specific non-proprietary communication protocols, such as G2S (game to system), GDS (gaming device standard) and S2S (system to system) communication protocols provided by the Gaming Standards Association (GSA), Fremont, Calif., can be implemented on the gaming devices described herein.

The gaming device 604 can communicate with one or more remote devices via one or more network interfaces, such as 612. For instance, via network interfaces 612 and the network 601, the gaming device 604 can communicate with other gaming devices, such as server 602 and/or gaming devices, 652, 654 and 656. The network interfaces can provide wired or wireless communications pathways for the gaming device 604. Some gaming devices may not include a network interface or can be configured to operate in a stand-alone mode where the network interface is not connected to a network.

In other embodiments, a mobile device interface or interfaces, such as 614, can be provided for communicating with a mobile device, such as a cell phone or a tablet computer carried by players or casino personnel temporarily in the vicinity of the gaming device 604. A wireless communication protocol, such as Bluetooth™ and a Wi-Fi compatible standard, can be used for communicating with the mobile devices via the mobile device interfaces 614. In one embodiment, the mobile device interface can implement a short range communication protocol, such as a near-field communication (NFC) protocol used for mobile wallet applications. NFC is typically used for communication distances of 4 cm or less. In addition, a wired communication interface, such as a docking station, can be integrated into the gaming device, such as 604. The wired communication interface can be configured to provide communications between the gaming device 604 and the mobile device and/or providing power to the mobile device.

Figure 5:
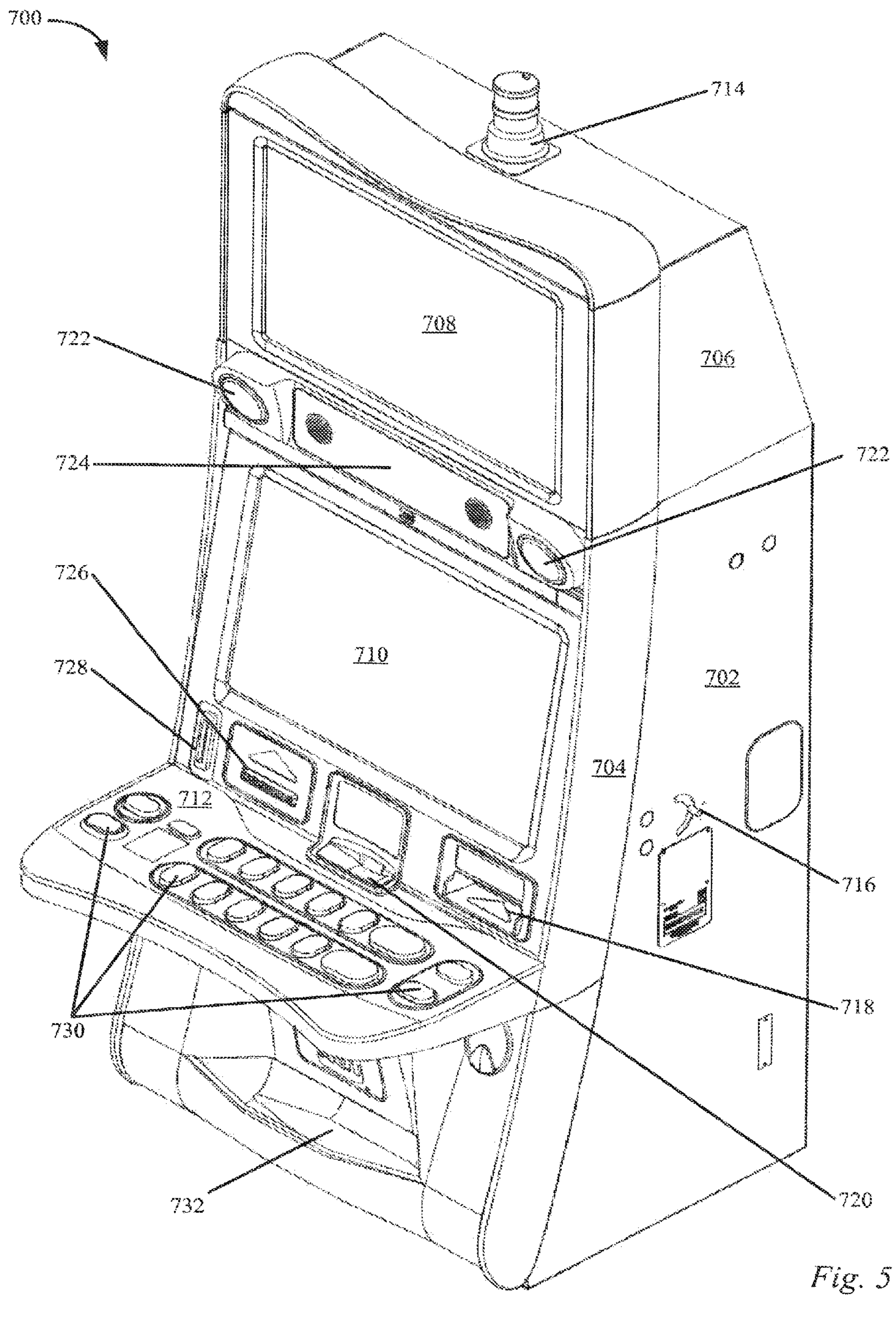
FIG. 5 shows a perspective drawing of a gaming device in accordance with the described embodiments.

The gaming device 604 can include one or more each of value input devices 616 and value output device 618. The value input devices 616 can be used to deposit cash or indicia of credit onto the gaming device. The cash or indicia of credit can be used to make wagers on games played on the gaming device 604. Examples of value input devices 616 include but are not limited to a magnetic-striped card or smart card reader, a bill and/or ticket acceptor, a network interface for downloading credits from a remote source, a wireless communication interface for reading credit data from nearby devices and a coin acceptor. A few examples of value input devices are shown in FIG. 5.

The value output devices can be used to dispense cash or indicia of credit from the gaming device 604. Typically, the indicia of credit can be exchanged for cash, instance, the indicia of credit can be exchanged at a cashier station or at a redemption station. Examples of value output devices can include a network interface for transferring credits into a remote account, a wireless communication interface that can be used with a mobile device implementing mobile wallet application, a coin hopper for dispensing coins or tokens, a bill dispenser, a card writer, a printer for printing tickets or cards redeemable for cash or credits. Another type of value output device is a merchandise dispenser, which can be configured to dispense merchandise with a tangible value from a gaming device. A few examples of value output devices are shown in FIG. 5.

The combination of value input devices 616 and value output devices 618 can vary from device to device. In some embodiments, a gaming device 604 may not include a value input device or a value output device. For instance, a thin-client gaming device used in a mobile gaming application may not include a value input device and a value output device. Instead, a remote account can be used to maintain the credits won or lost from playing wager-based games via the mobile device. The mobile device can be used to access the account and affect the account balance via game play initiated on the mobile device. Credits can be deposited or withdrawn from the remote account via some mechanism other than via the mobile device interface.

In yet other embodiments, the gaming device 604 can include one or more secondary controllers 619. The secondary controllers can be associated with various peripheral devices coupled to the gaming device, such as the value input devices and value output devices described in the preceding paragraphs. As another example, the secondary controllers can be associated with peripheral devices associated with the player interface 608, such as input devices, video displays, electro-mechanical displays and a player tracking unit. In some embodiments, the secondary controllers can receives instructions and/or data from and provide responses to the game controller 606. The secondary controller can be configured to interpret the instructions and/or data from the game controller 606 and control a particular device according to the received instructions and/or data. For instance, a print controller may receive a print command with a number of parameters, such as a credit amount and in response print a ticket redeemable for the credit amount. In another example, a touch screen controller can detect touch inputs and send information to the game controller 606 characterizing the touch input.

In a particular embodiment, a secondary controller can be used to control a number of peripheral devices independently of the game controller 606. For instance, a player tracking unit can include one or more of a video display, a touch screen, card reader, network interface or input buttons. A player tracking controller can control these devices to provide player tracking services and bonusing on the gaming device 604. In alternate embodiments, the game controller 604 can control these devices to perform player tracking functions. An advantage of performing player tracking functions via a secondary controller, such as a player tracking controller, is that since the player tracking functions don't involve controlling the wager-based game, the software on the player tracking unit can be developed modified via a less lengthy and regulatory intensive process than is required for software executed by the game controller 606, which does control the wager-based game. In general, using a secondary controller, certain functions of the gaming device 604 that are not subject to as much regulatory scrutiny as the game play functions can be decoupled from the game controller 606 and implemented on the secondary controller instead. An advantage of this approach, like for the player tracking controller, is that software approval process for the software executed by the secondary controller can be less intensive than the process needed to get software approved for the game controller.

A mass storage unit(s) 620, such as a device including a hard drive, optical disk drive, flash memory or some other memory storage technology can be used to store applications and data used and/or generated by the gaming device 604. For instance, a mass storage unit, such as 620, can be used to store gaming applications executed by the game controller 606 where the gaming device 604 can be configured to receive downloads of game applications from remote devices, such as server 602. In one embodiment, the game controller 606 can include its own dedicated mass storage unit. In another embodiment, critical data, such as game history data stored in the power-hit tolerant memory 630 can be moved from the power-hit tolerant memory 630 to the mass storage unit 620 at periodic intervals for archival purposes and to free up space in the power-hit tolerant memory 630.

The gaming device 604 can include security circuitry 622, such as security sensors and circuitry for monitoring the sensors. The security circuitry 622 can be configured to operate while the gaming device is receiving direct power and operational to provide game play as well as when the gaming device is uncoupled from direct power, such as during shipping or in the event of a power failure. The gaming device 604 can be equipped with one or more secure enclosures, which can include locks for limiting access to the enclosures. One or more sensors can be located within the secure enclosures or coupled to the locks. The sensors can be configured to generate signals that can be used to determine whether secure enclosures have been accessed, locks have been actuated or the gaming device 604, such as a mobile device has been moved to an unauthorized area. The security monitoring circuitry can be configured to generate, store and/or transmit error events when the security events, such as accessing the interior of the gaming device, have occurred. The error events may cause the game controller 606 to place itself in a "safe" mode where no game play is allowed until the error event is cleared.

The server 602 can be configured to provide one or more functions to gaming devices or other servers in a gaming system 600. The server 602 is shown performing a number of different functions. However, in various embodiments, the functions can be divided among multiple servers where each server can communicate with a different combination of gaming devices. For instance, player interface support 636 and gaming device software 638 can be provided on a first server, progressives can be provided on a second server, loyalty program functions 640 and accounting 648 can be provided on a third server, linked gaming 644 can be provided on a fourth server, cashless functions 646 can be provided on a fifth server and security functions 650 can be provided on a sixth server. In this example, each server can communicate with a different combination of gaming devices because each of the functions provided by the servers may not be provided to every gaming device in the gaining system 600. For instance, the server 602 can be configured to provide progressive gaming functions to gaming devices 604, 652 and 656 but not gaming device 654. Thus, the server 602 may not communicate with the mobile gaming device 654 if progressive functions are not enabled on the mobile gaming device at a particular time.

Typically, each server can include an administrator interface that allows the functions of a server, such as 602, to be configured and maintained. Each server 602 can include a processor and memory. In some embodiments, the servers, such as 602, can include a game controller with components, such as but not limited to a power-hit tolerant memory 630, a trusted memory 632 and an RNG 634 described with respect to gaming device 604. The servers can include one or more network interfaces on which wired or wireless communication protocols can be implemented. Next, some possible functions provided by the server 602 are described. These functions are described for the purposes of illustration only and are not meant to be limiting.

The player interface support 636 can be used to serve content to gaming devices, such as 604, 652, 654 and 656, remote to the server. The content can include video and audio content that can be output on one of the player interfaces, such as 608, 652*a*, 654*a* and 656*a*. Further, the content can be configured to utilize unique features of a particular player interface, such as video displays, wheels or reels, if the particular player interface is so equipped.

In one embodiment, via the player interface support, content can be output to all or a portion of a primary video display that is used to output wager-based game outcomes on a player interface associated with a gaming device. For instance, a portion of the primary display can be allocated to providing a "service window" on the primary video display where the content in the service window is provided from a server remote to the gaming device. In particular embodiments, the content delivered from the server to a gaming device as part of the player interface support 636 can be affected by inputs made on the gaming device. For instance, the service window can be generated on a touch screen display where inputs received via the service window can be sent back to server 602. In response, to the received inputs, the server 602 can adjust the content that is displayed on the remote gaming device that generated the inputs.

If a player's identity is known, then the player interface support 636 can be used to provide custom content to a remote gaming device, such as 604. For instance, a player can provide identification information, such as information indicating their membership in a loyalty program, during their utilization of a gaming device. The custom content can be selected to meet the identified player's interests. In one embodiment, the player's identity and interests can be managed via a loyalty program, such as via a loyalty program account associated with loyalty function 640. The custom content can include notifications, advertising and specific offers that are determined to be likely of interest to a particular player.

The gaming device software function 638 can be used to provide downloads of software for the game controller and/or second controllers associated with peripheral devices on a gaming device. For instance, the gaming device software 638 may allow an operator and/or a player to select a new game for play on a gaming device. In response to the game selection, the gaming device software function 638 can be used to download game software that allows a game controller to generate the selected game. In another example, in response to determining that a new counterfeit bill is being accepted by bill acceptors in the gaming system 600, the gaming device software function 638 can be used to download a new detection algorithm to the bill acceptors that allow the counterfeit bill to be detected.

The progressive gaming function 642 can be used to implement progressive game play on one or more gaming devices. In progressive game play, a portion of wagers associated with the play of a progressive game is allocated to a progressive jackpot. A group of gaming devices can be configured to support play of the progressive game and contribute to the progressive jackpot. In various embodiments, the gaming devices contributing to a progressive jackpot may be a group of gaming devices collocated near one another, such as a bank of gaming machines on a casino floor, a group of gaming devices distributed throughout a single casino, or group of gaming devices distributed throughout multiple casinos (e.g., a wide area progressive). The progressive gaming function 642 can be used to receive the jackpot contributions from each of the gaming devices participating in the progressive game, determine a current jackpot and notify participating gaming devices of the current progressive jackpot amount, which can be displayed on the participating gaming devices if desired.

The loyalty function 640 can be used to implement a loyalty program within a casino enterprise. The loyalty function 640 can be used to receive information regarding activities within a casino enterprise including gaming and non-gaming activities and associate the activities with particular individuals. The particular individuals can be known or may be anonymous. The loyalty function 640 can used to store a record of the activities associated with the particular individuals as well as preferences of the individuals if known. Based upon the information stored with the loyalty function 640 comps (e.g., free or discounted services including game play), promotions and custom contents can be served to the particular individuals.

The linked gaming function 644 can be used to used provide game play activities involving player participating as a group via multiple gaming devices. An example, a group of player might be competing against one another as part of a slot tournament. In another example, a group of players might be working together in attempt to win a bonus that can be shared among the players.

The cashless function 646 can enable the redemption and the dispensation of cashless instruments on a gaming device. For instance, via the cashless function, printed tickets, serving as a cashless instrument, can be used to transfer credits from one gaming device to another gaming device. Further, the printed tickets can be redeemed for cash. The cashless function can be used to generate identifying information that can be stored to a cashless instrument, such as a printed ticket, that allows the instrument to later be authenticated. After authentication, the cashless instrument can be used for additional game play or redeemed for cash.

The accounting function can receive transactional information from various gaming devices within the gaming system 600. The transactional information can relate to value deposited on each gaming device and value dispensed from each gaming device. The transactional information, which can be received in real-time, can be used to assess the performance of each gaming device as well as an overall performance of the gaming system. Further, the transactional information can be used for tax and auditing purposes.

The security function 650 can be used to combat fraud and crime in a casino enterprise. The security function 650 can be configured to receive notification of a security event that has occurred on a gaming device, such as an attempt at illegal access. Further, the security function 650 can receive transactional data that can be used to identify if gaming devices are being utilized in a fraudulent or unauthorized manner. The security function 650 can be configured to receive, store and analyze data from multiple sources including detection apparatus located on a gaming device and detection apparatus, such as cameras, distributed throughout a casino. In response to detecting a security event, the security function 650 can be configured to notify casino personnel of the event. For instance, if a security event is detected at a gaming device, a security department can be notified. Depending on the security event, one or more team members of the security department can be dispatched to the vicinity of the gaming device. Next, a perspective diagram of a slot-type gaming device that can include all or a portion of the components described with respect to gaming device 604 is described.

FIG. 5 shows a perspective drawing of a gaming device 700 in accordance with the described embodiments. The gaming device 700 is example of what can be considered a "thick-client." Typically, a thick-client is configurable to communicate with one or more remote servers but provides game play, such as game outcome determination, independent of the remote servers. In addition, a thick-client can be considered as such because it includes cash handling capabilities, such as peripheral devices for receiving cash, and a secure enclosure within the device for storing the received cash. In contrast, thin-client device, such as a mobile gaming device, may be more dependent on a remote server to provide a component of the game play on the device, such as game outcome determination, and/or may not include peripheral devices for receiving cash and an associated enclosure for storing it.

Many different configurations are possible between thick and thin clients. For instance, a thick-client device, such as 700, deployed in a central determination configuration, may receive game outcomes from a remote server but still provide cash handling capabilities. Further, the peripheral devices can vary from gaming device to gaming device. For instance, the gaming device 700 can be configured with electro-mechanical reels to display a game outcome instead of a video display, such as 710. Thus, the features of gaming device 700 are described for the purposes of illustration only and are not meant to be limiting.

The gaming device 700 can include a main cabinet 702. The main cabinet 702 can provide a secure enclosure that prevents tampering with the device components, such as a game controller (not shown) located within the interior of the main cabinet and cash handing devices including a coin acceptor 720, a ticket printer 726 and a bill acceptor 718. The main cabinet can include an access mechanism, such as door 704, which allows an interior of the gaming device 700 to be accessed. The actuation of the door 704 can be controlled by a locking mechanism, such as lock 716. The lock 716, the door 704 and the interior of the main cabinet 702 can be monitored with security sensors for detecting whether the interior has been accessed. For instance, a light sensor can be provided to detect a change in light-level in response to the door 704 being opened.

The interior of the main cabinet 700 can include additional secure enclosure, which can also be fitted with locking mechanisms. For instance, the game controller, such as game controller 606, shown in FIG. 4, can be secured within a separate locked enclosure. The separate locked enclosure for the game controller may allow maintenance functions to be performed on the gaming device, such as emptying a drop box for coins, emptying a cash box or replacing a device, while preventing tampering with the game controller. Further, in the case of device with a coin acceptor, 720, the separate enclosure can protect the electronics of the game controller from potentially damaging coin dust.

A top box 706 can be mounted to the top of the main cabinet 702. A number of peripheral devices can be coupled to the top box 706. In FIG. 5, a display device 708 and a candle device 714 are mounted to the top box 706. The display device 708 can be used to display information associated with game play on the gaming device 700. For instance, the display device 708 can be used to display a bonus game presentation associated with the play of a wager-based game (One or more bonus games are often features of many wager-based games). In another example, the display device 708 can be used to display information associated with a progressive game, such as one or more progressive jackpot amounts. In yet another example, the display device 708 can be used to display an attract feature that is intended to draw a potential player's attention to the gaming device 700 when it is not in use.

The candle device 714 can include a number of lighting elements. The lighting elements can be lit in different patterns to draw attention to the gaming device. For instance, one lighting pattern may indicate that service is needed at the gaming device 700 while another light pattern may indicate that a player has requested a drink. The candle device 714 is typically placed at the top of gaming device 700 to increase its visibility. Other peripheral devices, including custom bonus devices, such as reels or wheels, can be included in a top box 706 and the example in FIG. 5 is provided for illustrative purposes only. For instance, some of the devices coupled to the main cabinet 702, such as printer 726, can be located in a different to box configuration.

The gaming device 700 provides a player interface that allows the play of a game, such as wager-based game. In this embodiment, the player interface includes 1) a primary video display 710 for outputting video images associated with the game play, 2) audio devices, such as 722, for outputting audio content associated with game play and possibly casino operations, 3) an input panel 712 for at least providing game play related inputs and 4) a secondary video display 708 for outputting video content related to the game play (e.g., bonus material) and/or the casino enterprise (e.g., advertising). In particular embodiments, one or both of the video displays, 708 and 710, can be equipped with a touch screen sensor and associated touch screen controller, for detecting touch inputs, such as touch inputs associated with the play of a game or a service window output to the display device.

The input panel 712 can include a number of electro-mechanical input buttons, such as 730, and/or touch sensitive surfaces. For instance, the input panel can include a touch screen equipped video display to provide a touch sensitive surface. In some embodiments, the functions of the electro-mechanical input buttons can be dynamically reconfigurable. For instance, the function of the electro-mechanical input buttons may be changed depending on the game that is being played on the gaming device. To indicate function changes, the input buttons can each include a configurable display, such as an e-ink or a video display for indicating the function of button. The output of the configurable display can be adjusted to account for a change in the function of the button.

The gaming device 700 includes a card reader 728, a printer 726, a coin acceptor 720, a bill and/or ticket acceptor 720 and a coin hopper (not shown) for dispensing coins to a coin tray 732. These devices can provide value input/output capabilities on the gaming device 700. For instance, the printer 726 can be used to print out tickets redeemable for cash or additional game play. The tickets generated by printer 726 as well as printers on other gaming devices can be inserted into bill and ticket acceptor 718 to possibly add credits to the gaming device 700. After the ticket is authenticated, credits associated with the ticket can be transferred to the gaming device 700.

The device 718 can also be used to accept cash bills. After the cash bill is authenticated, it can be converted to credits on the gaming device and used for wager-based game play. The coin acceptor 720 can be configured to accept coins that are legal tender or tokens, such as tokens issued by a casino enterprise. A coin hopper (not shown) can be used to dispense coins that are legal tender or tokens into the coin tray 732.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A method comprising:

(a) receiving, at a network interface of a server and from a gaming machine, transaction information regarding participation by a player in a gaming activity at the gaming machine within a casino, said gaming activity including:
  - (i) receipt, by an acceptor of the gaming machine, of a physical item associated with a monetary value;
  - (ii) establishment of a credit balance on the gaming machine;
  - (iii) for each of one or more plays of a wagering game on the gaming machine, placement of a wager following receipt of an actuation of a wager button, the credit balance decreasable by said wager;
  - (iv) display of the one or more plays of the wagering game on the gaming machine;
  - (v) modification of the credit balance based on any awards for the one or more plays of the wagering game; and
  - (vi) initiation of a payout associated with the credit balance following receipt of an actuation of a cash-out button;

(b) determining, by the server and based upon the transaction information, that the player has not been identified via a casino-provided player tracking device;

(c) determining, by the server, a location of the gaming machine;

(d) receiving, at the network interface of the server and from one or more receiver devices within the casino, wireless signal data from a plurality of portable wireless devices located within the casino, wherein the portable wireless devices are not casino-provided player tracking devices;

(e) determining, by the server and based upon the wireless signal data, a location for each of the plurality of portable wireless devices within the casino;

(f) determining, by the server, whether one of the plurality of portable wireless devices is within a threshold distance from the location of the gaming machine; and (g) if one of the plurality of portable wireless devices is within the threshold distance from the location of the gaming machine:

(i) determining, by the server, unique identifying information of the portable wireless device; and (ii) if one of a plurality of different loyalty program accounts is associated with the unique identifying information of the portable wireless device, assigning, by the server, at least a portion of the gaming activity to a registered customer associated with the loyalty program account.

2. The method of claim 1, further comprising:

updating, by the server, the loyalty program account based on the transaction information and the portion of the gaming activity assigned to the registered customer.

3. The method of claim 2, wherein the loyalty program account is updated by determining a value of the portion of the gaming activity assigned to the registered customer and determining a number of loyalty points to add to the loyalty program account based on the determined value.

4. The method of claim 3, wherein the number of loyalty points is less than the number of loyalty points attributable to the registered customer had the registered customer been identified via the casino-provided player tracking device.

5. The method of claim 1, further comprising:

determining, by the server, the portion of the gaming activity to be assigned to the registered customer prior to assigning the portion of the gaming activity to the registered customer.

6. The method of claim 1, further comprising:

storing, by the server, the transaction information to the loyalty program account.

7. The method of claim 1, which includes, if none of the plurality of different loyalty program accounts are associated with the unique identifying information of the portable wireless device, creating, by the server, a virtual customer account associated with the unique identifying information and assigning, by the server, at least a portion of the gaming activity to the virtual customer account.

8. The method of claim 7, which includes transmitting, by the network interface of the server, an instruction to the gaming machine to display an offer to register for a player loyalty account.

9. The method of claim 7, which includes deleting, by the server, the virtual customer account if no activity associated with the virtual customer account occurs within a designated period.

10. A server, comprising:

a memory;

a network interface configured to receive transaction information regarding participation by a player in a gaming activity within a casino and wireless signal data from one or more receiver devices within the casino, the wireless signal data collected by the one or more receiver devices from a plurality of portable wireless devices located within the casino, wherein the plurality of portable wireless devices are not casino-provided player tracking devices, the gaming activity including;

(i) receipt, by an acceptor of the gaming machine, of a physical item associated with a monetary value;

(ii) establishment of a credit balance on the gaming machine;

(iii) for each of one or more plays of a wagering game on the gaming machine, placement of a wager following receipt of an actuation of a wager button, the credit balance decreasable by said wager;

(iv) display of the one or more plays of the wagering game on the gaming machine;

(v) modification of the credit balance based on any awards for the one or more plays of the wagering game; and (vi) initiation of a payout associated with the credit balance following receipt of an actuation of a cash-out button; and a processor configured to:

receive the transaction information and the wireless signal data via the network interface;

determine, based upon the transaction information, that the player has not been identified via a casino-provided player tracking device;

determine a location of the gaming machine;

determine, based upon the wireless signal data, a location for each of the plurality of portable wireless devices within the casino;

determine whether one of the plurality of portable wireless devices is within a threshold distance from the location of the gaming machine; and if one of the plurality of portable wireless devices is within the threshold distance from the location of the gaming machine:

(i) determine unique identifying information of the portable wireless device; and (ii) if one of a plurality of different loyalty program accounts is associated with the unique identifying information of the portable wireless device, assign at least a portion of the gaming activity to a registered customer associated with the loyalty program account.

11. The server of claim 10, wherein the processor is further configured to:

update the loyalty program account based on the transaction information and the portion of the gaming activity assigned to the registered customer.

12. The server of claim 11, wherein the loyalty program account is updated by determining a value of the portion of the gaming activity assigned to the registered customer and determining a number of loyalty points to add to the loyalty program account based on the determined value.

13. The server of claim 12, wherein the number of loyalty points is less than the number of loyalty points attributable to the registered customer had the registered customer been identified via the casino-provided player tracking device.

14. The server of claim 10, wherein the processor is further configured to:

determine the portion of the gaming activity to be assigned to the registered customer prior to assigning the portion of the gaming activity to the registered customer.

15. The server of claim 10, wherein the processor is further configured to:

store the transaction information to the loyalty program account.

16. The server of claim 10, wherein the processor is configured to, if none of the plurality of different loyalty program accounts are associated with the unique identifying information of the portable wireless device, create a virtual customer account associated with the unique identifying information and assign at least a portion of the gaming activity to the virtual customer account.

17. The server of claim 16, wherein the processor is configured to transmit an instruction to the gaming machine to display an offer to register for a player loyalty account.

18. The server of claim 16, wherein the processor is configured to delete the virtual customer account if no activity associated with the virtual customer account occurs within a designated period.

19. A gaming system comprising:

a server;

a plurality of receiver devices in communication with the server; and a gaming machine including:

a housing;

an acceptor supported by the housing and configured to receive a physical item associated with a monetary value to facilitate establishment of a credit balance a wager button actuatable to place a wager on a play of a wagering game;

a cashout button actuatable to initiate a payout associated with the credit balance;

a display device configured to display the play of the wagering game;

a processor; and a memory device that stores a plurality of instructions that, when executed by the processor, cause the processor to operate with the acceptor, the wager button, the cashout button, and the display device to provide the play of the wager-based game, wherein the server, the plurality of receiver devices, and the gaming machine are operable with one another to:

transmit, by the gaming machine, transaction information regarding participation by a player in a gaming activity at the gaming machine;

receive, by the server, the transaction information;

determine, by the server and based upon the transaction information, that the player has not been identified via a casino-provided player tracking device;

determine by the server, a location of the gaming machine;

receive, by the plurality of receiver devices, wireless signal data from a plurality of portable wireless devices located within the casino, wherein the portable wireless devices are not casino-provided player tracking devices;

determine, by the server and based upon the wireless signal data, a location for each of the plurality of portable wireless devices;

determine, by the server, whether one of the plurality of portable wireless devices is within a threshold distance from the location of the gaming machine; and if one of the plurality of portable wireless devices is within the threshold distance from the location of the gaming machine:

(i) determine, by the server, unique identifying information of the portable wireless device; and (ii) if one of a plurality of different loyalty program accounts is associated with the unique identifying information of the portable wireless device, assign, by the server, at least a portion of the gaming activity to the registered customer having the loyalty program account.

20. The gaming system of claim 19, wherein the server is further configured to:

update the loyalty program account based on the transaction information and the portion of the gaming activity assigned to the registered customer.

21. The gaming system of claim 20, wherein the loyalty program account is updated by determining a value of the portion of the gaming activity assigned to the registered customer and determining a number of loyalty points to add to the loyalty program account based on the determined value.

22. The gaming system of claim 21, wherein the number of loyalty points is less than the number of loyalty points attributable to the registered customer had the registered customer been identified via the casino-provided player tracking device.

23. The gaming system machine of claim 19, wherein the server is further configured to:

determine the portion of the gaming activity to be assigned to the registered customer prior to assigning the portion of the gaming activity to the registered customer.

24. The gaming system machine of claim 19, wherein the server is further configured to:

store the transaction information to the loyalty program account.

25. The gaming system of claim 19, wherein the server is configured to, if none of the plurality of different loyalty program accounts are associated with the unique identifying information of the portable wireless device, create a virtual customer account associated with the unique identifying information and assign at least a portion of the gaming activity to the virtual customer account.

26. The gaming system of claim 25, wherein the server is configured to transmit an instruction to the gaming machine to display an offer to register for a player loyalty account.

27. The gaming system of claim 25, wherein the server is configured to delete the virtual customer account if no activity associated with the virtual customer account occurs within a designated period.

* * * * *